(12) United States Patent
Namai et al.

(10) Patent No.: US 7,802,024 B2
(45) Date of Patent: Sep. 21, 2010

(54) CONTENT DISTRIBUTION SYSTEM, CONTENT DISTRIBUTION METHOD, CONTROL DEVICE, CONTROL METHOD, REPRODUCTION DEVICE, REPRODUCTION METHOD, AND PROGRAM

(75) Inventors: Mie Namai, Tokyo (JP); Naoki Yuasa, Chiba (JP); Shuichi Otsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 97 days.

(21) Appl. No.: 11/911,033

(22) PCT Filed: Apr. 6, 2006

(86) PCT No.: PCT/JP2006/307332

§ 371 (c)(1),
(2), (4) Date: Apr. 23, 2008

(87) PCT Pub. No.: WO2006/109672

PCT Pub. Date: Oct. 19, 2006

(65) Prior Publication Data

US 2009/0055557 A1      Feb. 26, 2009

(30) Foreign Application Priority Data

Apr. 7, 2005  (JP) .............................. 2005-111056
May 18, 2005 (JP) .............................. 2005-145102

(51) Int. Cl.
*G06F 3/00*    (2006.01)
*G06F 3/14*    (2006.01)

(52) U.S. Cl. .............................. 710/14; 710/15; 710/16; 715/864

(58) Field of Classification Search ...................... 710/1, 710/8, 14, 15, 16; 715/864
See application file for complete search history.

(56) References Cited

U.S. PATENT DOCUMENTS 6,748,462 B2 * 6/2004 Dubil et al. ..................... 710/8

FOREIGN PATENT DOCUMENTS

| JP | 8-31075    | 2/1996  |
|----|------------|---------|
| JP | 11-238367  | 8/1999  |
| JP | 2000-287159 | 10/2000 |
| JP | 2001-92575 | 4/2001  |
| JP | 2001-169370 | 6/2001  |
| JP | 2002-16990 | 1/2002  |
| JP | 2002-44753 | 2/2002  |

(Continued)

*Primary Examiner*—Alford W Kindred
*Assistant Examiner*—Richard Franklin
(74) *Attorney, Agent, or Firm*—Oblon, Spivak, McClelland, Maier & Neustadt, L.L.P.

(57) ABSTRACT

The present invention relates to a content distributing system, a content distributing method, a control apparatus, a control method, a playback apparatus, a playback method, and a program that are capable of improving operability of the control apparatus. A renderer 4 identifies a category of content to be played back and transmits an identification result of the category to a controller 2. In the controller 2, a receiving unit 21 receives the identification result transmitted from the renderer 4, and the display 27 performs a process of allowing a user to recognize a command to provide instructions about handling executable to the content to be played back among commands to provide instructions about handling of content in the renderer 4 based on the identification result. Also, the display 27, which has a function of a touch-panel, accepts an operation of specifying a command by the user.

10 Claims, 20 Drawing Sheets

FOREIGN PATENT DOCUMENTS

| | | |
|---|---|---|
| JP | 2002-44765 | 2/2002 |
| JP | 2003-143665 | 5/2003 |
| JP | 2004-129154 | 4/2004 |
| JP | 2004-221779 | 8/2004 |
| JP | 2005-20180 | 1/2005 |
| JP | 2005-020180 | 1/2005 |

* cited by examiner

| CATEGORY | DISPLAY PATTERN |
|---|---|
| AUDIO AND VISUAL | DISPLAY PATTERN FOR AUDIO AND VISUAL |
| VISUAL ONLY | DISPLAY PATTERN FOR VISUAL |
| AUDIO ONLY | DISPLAY PATTERN FOR AUDIO |

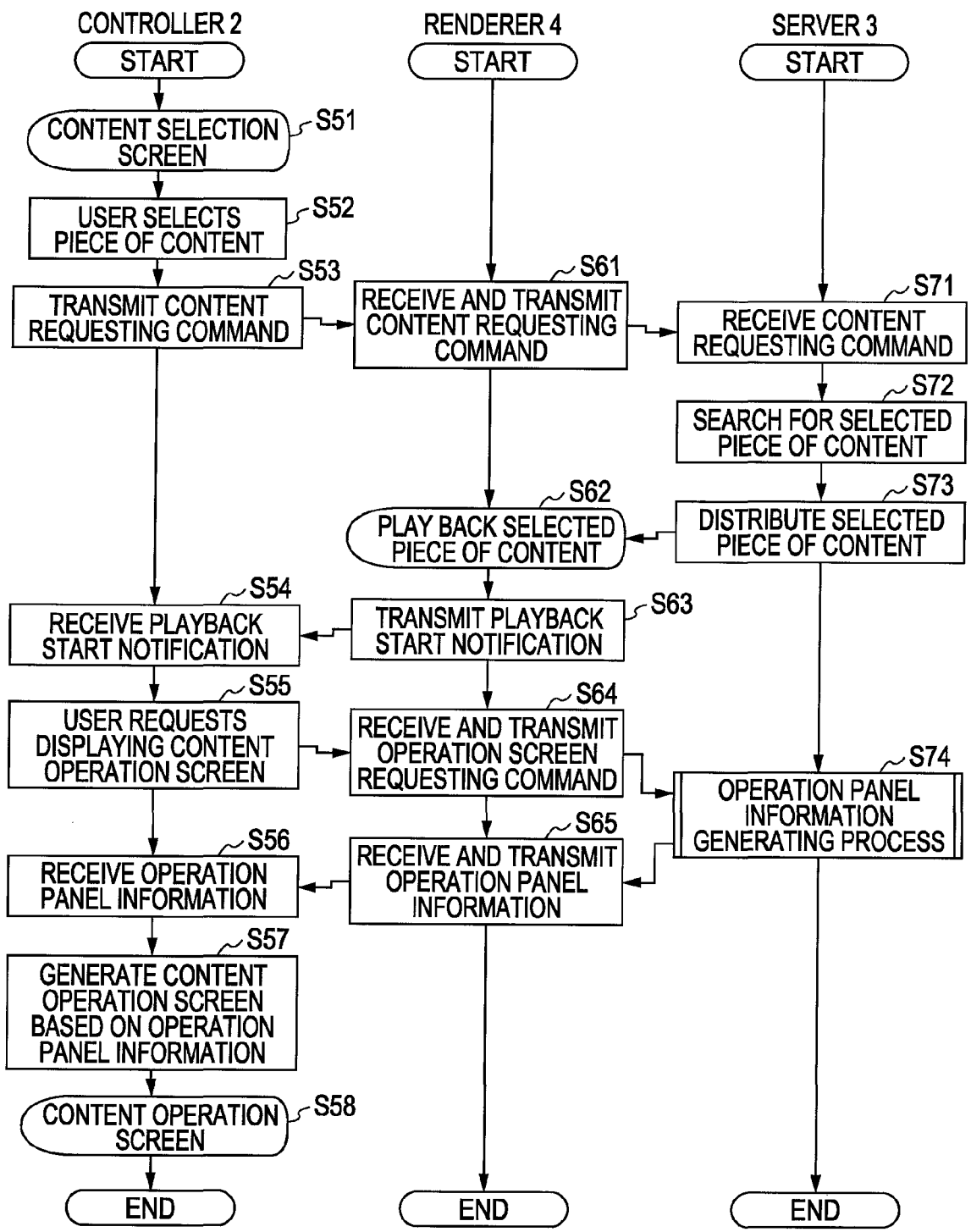

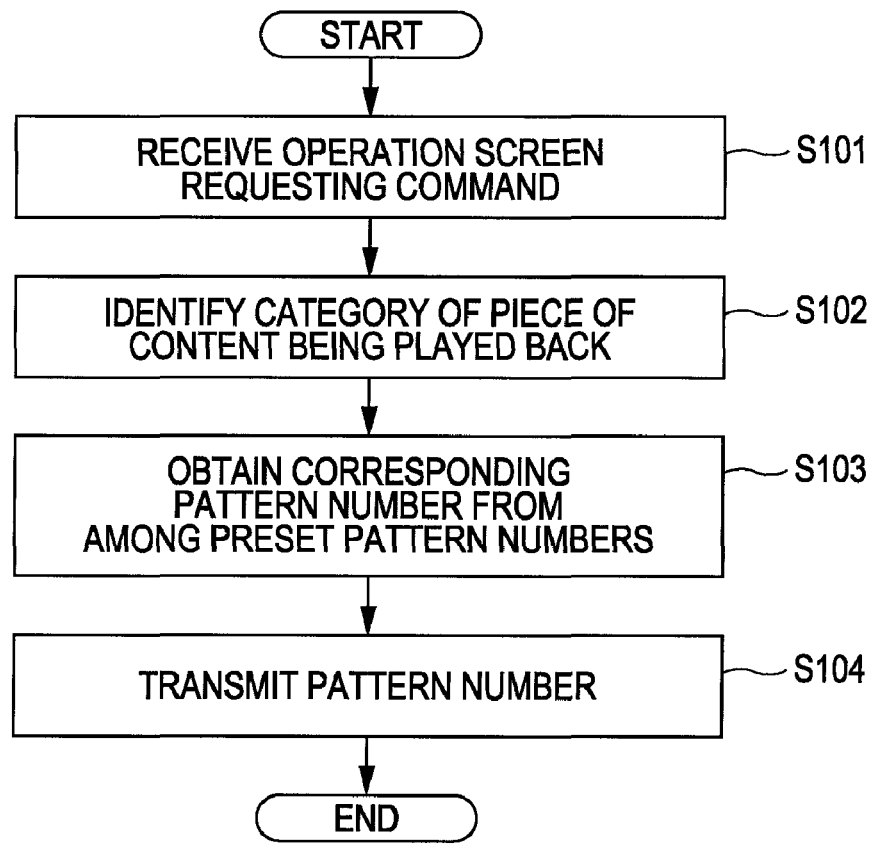

| PATTERN NUMBER | DISPLAY PATTERN |
|---|---|
| #01 | DISPLAY PATTERN FOR AUDIO AND VISUAL |
| #02 | DISPLAY PATTERN FOR VISUAL |
| #03 | DISPLAY PATTERN FOR AUDIO |

FIG. 14

| CATEGORY | ALL COMMANDS CORRESPONDING TO THE CATEGORY |
|---|---|
| AUDIO AND VISUAL | RUNNING-RELATED COMMANDS AND VOLUME-RELATED COMMANDS |
| VISUAL ONLY | RUNNING-RELATED COMMANDS |
| AUDIO ONLY | VOLUME-RELATED COMMANDS |

FIG. 15

| COMMAND | DATA OF GUI BUTTON |
|---|---|
| PLAY | DATA OF GUI BUTTON OF PLAY |
| STOP | DATA OF GUI BUTTON OF STOP |
| FAST-FORWARD | DATA OF GUI BUTTON OF FAST-FORWARD |

| CATEGORY | LAYOUT INFORMATION |
|---|---|
| AUDIO AND VISUAL | LAYOUT INFORMATION FOR AUDIO AND VISUAL |
| VISUAL ONLY | LAYOUT INFORMATION FOR VISUAL |
| AUDIO ONLY | LAYOUT INFORMATION FOR AUDIO |

CONTENT DISTRIBUTION SYSTEM, CONTENT DISTRIBUTION METHOD, CONTROL DEVICE, CONTROL METHOD, REPRODUCTION DEVICE, REPRODUCTION METHOD, AND PROGRAM

TECHNICAL FIELD

The present invention relates to a content distributing system, a content distributing method, a control apparatus, a control method, a playback apparatus, a playback method, and a program. Particularly, the present invention relates to a content distributing system, a content distributing method, a control apparatus, a control method, a playback apparatus, a playback method, and a program that enable improvement of operability of the control apparatus.

BACKGROUND ART

In a conventional content distributing system to distribute content from a server to a renderer (playback apparatus) via a network, when a user operates content played back by the renderer by using a controller (control apparatus), the user needs to find an appropriate command key among a plurality of command keys on an operation panel of the controller and operate the command key after precisely understanding the category of the content and commands operable to the content.

There is suggested a system to allow a controller to display only command keys related to a disc in accordance with the type of the disc loaded into a multi-disc player, in order to improve the operability of the controller provided with a plurality of command keys (e.g., Patent Document 1).

[Patent Document 1] Japanese Unexamined Patent Application Publication No. 8-31075

DISCLOSURE OF INVENTION

Problems to be Solved by the Invention

In the content distributing system to distribute content via a network, however, content distributed from a server is diversified and thus it is difficult for a user to precisely understand the details of the content. Furthermore, it is complicated for the user to find a command that is effective to the content distributed from the server among a plurality of command keys on an operation panel of a controller and operate the command, which reduces the operability of the controller.

Furthermore, the user cannot precisely understand the details of the content, so that operation mistakes in the controller increase and that user's satisfaction is difficult to obtain in terms of the operability of the controller.

The present invention has been made in view of these circumstances and is directed to improving the operability of the controller.

Means for Solving the Problems

In a content distributing system according to the present invention, a playback apparatus includes: identifying means for identifying a category of content to be played back; and transmitting means for transmitting an identification result of the category generated by the identifying means to a control apparatus, and the control apparatus includes: receiving means for receiving the identification result transmitted from the playback apparatus; processing means for performing a process of allowing a user to recognize a command to provide instructions about handling executable to the content to be played back among commands to provide instructions about handling of the content in the playback apparatus based on the identification result; and accepting means for accepting an operation of specifying a command to provide instructions about handling of the content.

A content distributing method according to the present invention includes: an identifying step of identifying a category of content to be played back; a transmitting step of transmitting an identification result of the category identified in the identifying step to a control apparatus; a receiving step of receiving the identification result transmitted from a playback apparatus; a processing step of performing a process of allowing a user to recognize a command to provide instructions about handling executable to the content to be played back among commands to provide instructions about handling of the content in the playback apparatus based on the identification result; and an accepting step of accepting an operation of specifying a command to provide instructions about handling of the content.

A first program according to the present invention includes: an identifying step of identifying a category of content to be played back; a transmission controlling step of controlling transmission of an identification result of the category identified in the identifying step to a control apparatus; a reception controlling step of controlling reception of the identification result transmitted from a playback apparatus; a processing step of performing a process of allowing a user to recognize a command to provide instructions about handling executable to the content to be played back among commands to provide instructions about handling of the content in the playback apparatus based on the identification result; and an accepting step of accepting an operation of specifying a command to provide instructions about handling of the content.

A control apparatus according to the present invention includes: processing means for performing a process of allowing a user to recognize a command to provide instructions about handling executable to content to be played back among commands to provide instructions about handling of content in a playback apparatus; and accepting means for accepting an operation of specifying a command to provide instructions about handling of the content.

A control method according to the present invention includes: a processing step of performing a process of allowing a user to recognize a command to provide instructions about handling executable to content to be played back among commands to provide instructions about handling of content in a playback apparatus; and an accepting step of accepting an operation of specifying a command to provide instructions about handling of the content.

A second program according to the present invention includes: a processing step of performing a process of allowing a user to recognize a command to provide instructions about handling executable to content to be played back among commands to provide instructions about handling of content in a playback apparatus; and an accepting step of accepting an operation of specifying a command to provide instructions about handling of the content.

A playback apparatus according to the present invention includes: identifying means for identifying a category of content to be played back; and transmitting means for transmitting an identification result of the category generated by the identifying means, the identification result being used in a process of allowing a user to recognize a command to provide instructions about handling executable to the content to be played back among commands to provide instructions about handling of content in the playback apparatus, to a control apparatus to control the playback apparatus.

A playback method according to the present invention, which is a playback method for a playback apparatus to play back content, includes: an identifying step of identifying a category of content to be played back; and a transmitting step of transmitting an identification result of the category identified in the identifying step, the identification result being used in a process of allowing a user to recognize a command to provide instructions about handling executable to the content to be played back among commands to provide instructions about handling of the content in the playback apparatus, to a control apparatus to control the playback apparatus.

A third program according to the present invention includes: an identifying step of identifying a category of content to be played back; and a transmission controlling step of controlling transmission of an identification result of the category identified in the identifying step, the identification result being used in a process of allowing a user to recognize a command to provide instructions about handling executable to the content to be played back among commands to provide instructions about handling of content in a playback apparatus, to a control apparatus to control the playback apparatus.

In the content distributing system, content distributing method, and first program according to the present invention, the playback apparatus identifies a category of content to be played back and transmits an identification result of the category to the control apparatus. The control apparatus receives the identification result transmitted from the playback apparatus, performs a process of allowing a user to recognize a command to provide instructions about handling executable to the content to be played back among commands to provide instructions about handling of content in the playback apparatus based on the identification result, and accepts an operation of specifying a command to provide instructions about handling of the content.

In the control apparatus, control method, and second program according to the present invention, a process of allowing a user to recognize a command to provide instructions about handling executable to content to be played back among commands to provide instructions about handling of content in a playback apparatus is performed, and an operation of specifying a command to provide instructions about handling of the content is accepted.

In the playback apparatus, playback method, and third program according to the present invention, a category of content to be played back is identified, and an identification result of the category, the identification result being used in a process of allowing a user to recognize a command to provide instructions about handling executable to the content to be played back among commands to provide instructions about handling of content in the playback apparatus, is transmitted to a control apparatus to control the playback apparatus.

Advantages

According to the present invention, operability of a control apparatus to control a playback apparatus can be improved.

BRIEF DESCRIPTION OF THE DRAWINGS

FIG. 9 is a flowchart illustrating another embodiment of the process performed by the content distributing system illustrated in FIG. 1.

FIG. 10 is a flowchart illustrating an embodiment of an operation panel information generating process.

FIG. 11 illustrates a table in which categories and pattern numbers each uniquely specifies one of the categories are registered while being associated with each other, the table being stored in a storage unit 45 of the server 3 illustrated in FIG. 6.

FIG. 14 illustrates a table in which categories and all commands corresponding to each of the categories are registered while being associated with each other, the table being stored in the storage unit 45 of the server 3 illustrated in FIG. 6.

FIG. 15 illustrates a table in which commands and data of a GUI button corresponding to each of the commands are registered while being associated with each other, the table being stored in the display pattern storing unit 24 of the controller 2 illustrated in FIG. 2.

Figure 1:
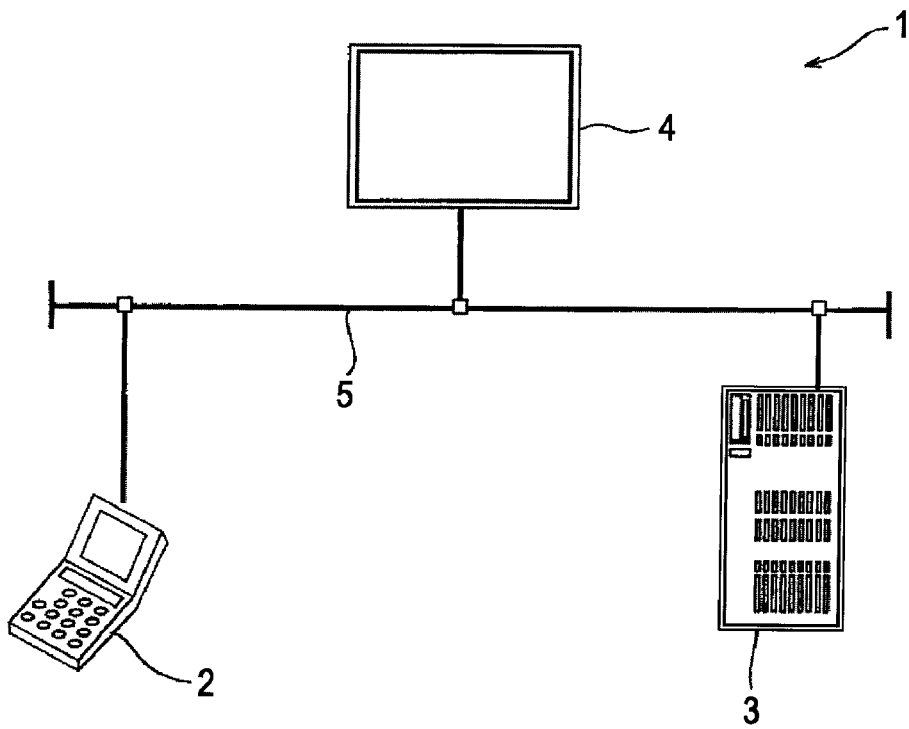
FIG. 1 illustrates an example of a configuration of an embodiment of a content distributing system to which the present invention is applied.

REFERENCE NUMERALS 1 content distributing system
2 controller
3 server
4 renderer
5 network
10 ROM
11 flash memory
12 CPU
13 RAM
14 input unit
15 output unit
16 communication unit
17 interface
18 bus
21 receiving unit
22 identifying unit
23 selecting unit
24 display pattern storing unit
25 operation panel
26 transmitting unit
27 display
28 key input unit
30 content operation screen
31 category display unit
32 GUI button display unit
41 ROM
42 CPU
43 RAM
44 communication unit
45 storage unit
46 drive
47 interface
48 bus
49 recording medium
60 content distributing system
61 controller
62 amplifier
63 speaker
64 audio cable
71 determining unit
72 transmitting unit
73 network transmitting unit
74 infrared transmitting unit
80 content operation screen
81 category display unit
82 GUI button display unit
83 screen switching GUI button
201 controller
202 converter
221 determining unit
222 transmitting unit
223 network transmitting unit
224 network transmitting unit
241 CPU
242 memory
244 network communication unit
245 infrared transmitting unit
261 network interface
262 command obtaining unit
263 converting unit
264 infrared transmission controlling unit
281 optical fiber
301 driving unit
302 cable

BEST MODE FOR CARRYING OUT THE INVENTION

Hereinafter, a specific embodiment of the present invention is described in detail with reference to the drawings.

FIG. 1 illustrates an example of a configuration of an embodiment of a content distributing system to which the present invention is applied.

In FIG. 1, the content distributing system 1 includes a controller 2, a server 3, a renderer 4, and a network 5. The controller 2, the server 3, and the renderer 4 are mutually connected via the network 5 and transmit/receive commands and content via the network 5.

For example, if the controller 2 transmits a command to request playing back content in the renderer 4 via the network 5, the renderer 4 receives the command via the network 5 and transmits the command to the server 3 via the network 5. The server 3 stores the content and distributes the content to the renderer 4 via the network 5 in accordance with the command transmitted from the renderer 4. Then, the renderer 4 plays back the content distributed from the server.

Figure 2:
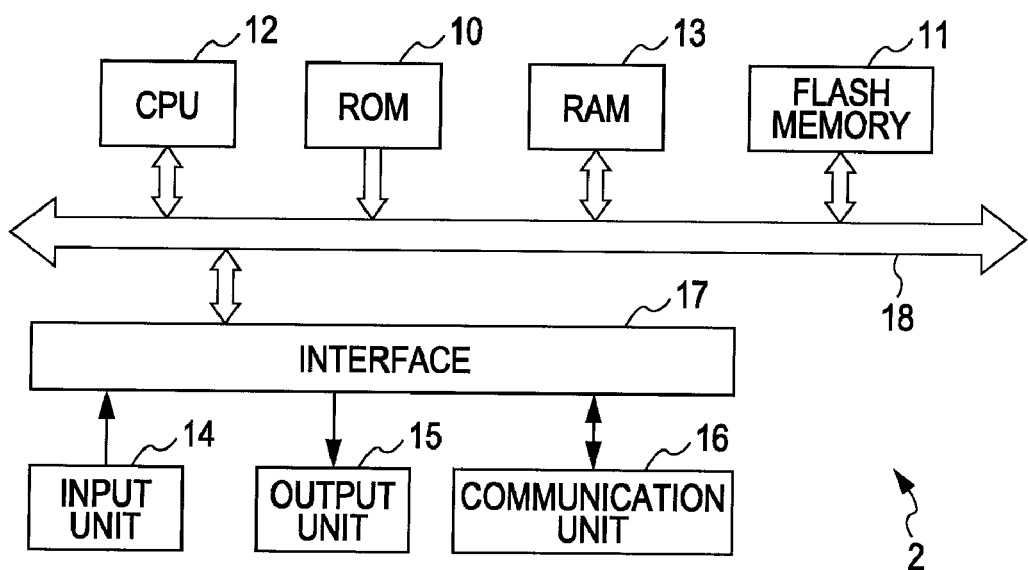
FIG. 2 is a block diagram of an example of a configuration of an embodiment of a controller 2 illustrated in FIG. 1.

FIG. 2 is a block diagram of an example of a configuration of an embodiment of the controller 2 illustrated in FIG. 1.

The controller 2 includes a ROM (read only memory) 10, a flash memory (e.g., EEPROM (electrically erasable and programmable read only memory)) 11, a CPU (central processing unit) 12, a RAM (random access memory) 13, an input unit 14, an output unit 15, a communication unit 16, an interface 17, and a bus 18. The input unit 14, the output unit 15, and the communication unit 16 connect to the interface 17. The ROM 10, the flash memory 11, the CPU 12, the RAM 13, and the interface 17 are mutually connected via the bus 18.

The ROM 10 and the flash memory 11 store programs. The CPU 12 performs various processes by executing the programs. The flash memory 11 also stores a display pattern table (e.g., see FIG. 4, described below). In the display pattern table, display patterns (information) that need to be held even after the power of the controller 2 is turned off are registered. The RAM 13 appropriately stores programs executed by the CPU 12 and necessary data.

The input unit 14 includes a plurality of physical input keys or a touch panel provided on a display of the output unit 15, and serves as an interface used by a user to input a command to the controller 2.

The output unit 15 includes a display, such as an LCD (liquid crystal display), and displays a content operation screen (e.g., see FIG. 5, described below) including GUI (graphical user interface) buttons (images representing commands) that are operated to input commands to the content to be played back by the renderer 4.

The communication unit 16 is a communication interface to perform communication via a wireless LAN (local area network) compatible with the standard of IEEE (Institute of Electrical and Electronics Engineers) 802, and communicates with the server 3 and the renderer 4 via the network 5.

For example, if a user inputs a command to request playing back content in the renderer 4 to the input unit 14, the command is supplied from the input unit 14 to the communication unit 16 via the interface 17, and is then transmitted from the communication unit 16 to the renderer 4 via the network 5. If the renderer 4 transmits information to the controller 2 via the network 5, the information is received by the communication unit 16 and is supplied to the CPU 12 via the interface 17 and the bus 18. The CPU 12 controls each unit of the controller 2 based on the information supplied from the communication unit 16.

Figures 3, 4:
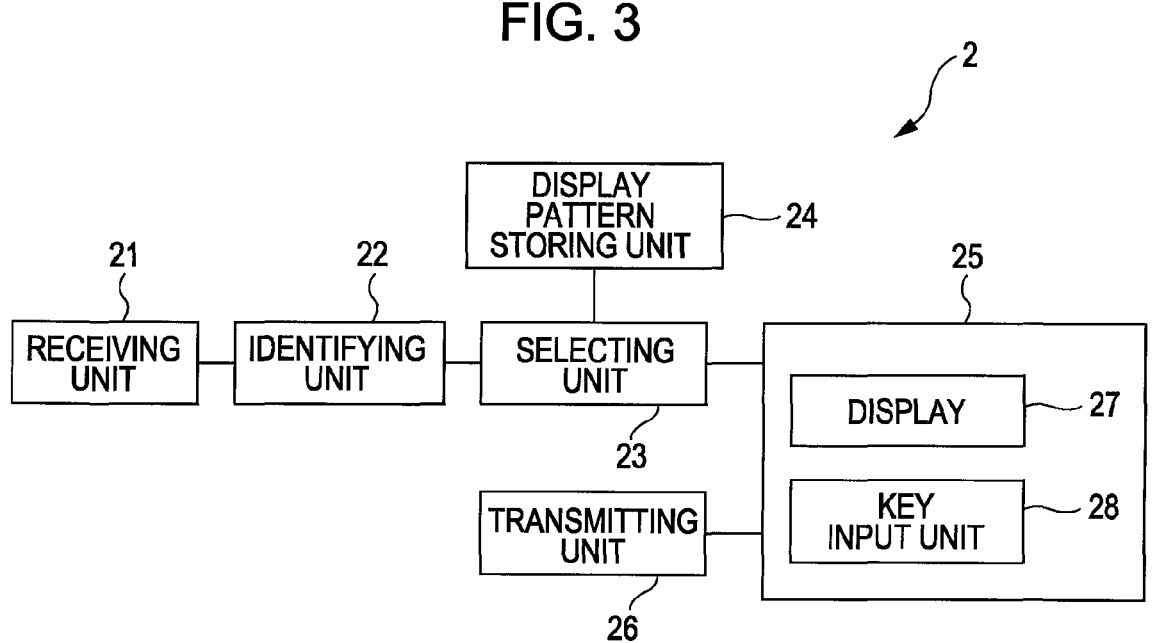
FIG. 3 is a block diagram of an example of a functional configuration of the controller 2 illustrated in FIG. 2.
FIG. 4 illustrates a display pattern table stored in a display pattern storing unit 24 illustrated in FIG. 3.

FIG. 3 is a block diagram of an example of a functional configuration of the controller 2 illustrated in FIG. 2. The functional configuration illustrated in FIG. 3 is realized when the CPU (computer) 12 included in the controller 2 illustrated in FIG. 2 executes a program.

The controller 2 includes a receiving unit 21, an identifying unit 22, a selecting unit 23, a display pattern storing unit 24, an operation panel 25, and a transmitting unit 26. The receiving unit 21 connects to the identifying unit 22, and the identifying unit 22 connects to the selecting unit 23. The selecting unit 23 connects to the display pattern storing unit 24 and the operation panel 25, and the operation panel 25 connects to the transmitting unit 26. The controller 2 connects to the network 5 by the receiving unit 21 and the transmitting unit 26.

The receiving unit 21 corresponds to the communication unit 16 illustrated in FIG. 2, and receives information transmitted from the server 3 or the renderer 4 via the network 5 and supplies the information to the identifying unit 22.

The identifying unit 22 identifies the category of the content that is being played back in the renderer 4 in accordance with the information supplied from the receiving unit 21 and supplies the identification result to the selecting unit 23.

The selecting unit 23 selects a display pattern corresponding to the category of the content that is being played back in the renderer 4 from the display pattern table stored in the display pattern storing unit 24 based on the identification result supplied from the identifying unit 22, and supplies the selected display pattern to the operation panel 25.

The display pattern storing unit 24 stores the display pattern table in which a plurality of display patterns are registered. The display pattern table is used to display a content operation screen (e.g., the content operation screen 30 illustrated in FIG. 5, described below) on a display 27 of the operation panel 25. The display pattern table is described below with reference to FIG. 4.

The operation panel 25 includes the display 27 to display various screens and a key input unit 28 including a plurality of input keys, and is used by a user to input a command transmitted from the controller 2 to the renderer 4. That is, the operation panel 25 supplies a command that is input through an operation of the key input unit 28 by a user to the transmitting unit 26. Also, the operation panel 25 displays a content operation screen on the display 27 based on a display pattern supplied from the selecting unit 23.

The transmitting unit 26 corresponds to the communication unit 16 illustrated in FIG. 2 and transmits a command supplied from the operation panel 25 to the renderer 4 via the network 5.

The display 27 corresponds to the output unit 15 illustrated in FIG. 2, has a display function to display GUI buttons and so on, and displays a content operation screen based on a display pattern supplied from the selecting unit 23 when a user operates the content that is being played back in the renderer 4 so that the user can recognize the commands operable to the content. Also, when the user selects a piece of content to be played back by the renderer 4 from among a plurality of pieces of content stored in the server 3, the display 27 displays a content selection screen listing the titles of the plurality of pieces of content.

The display 27 also corresponds to a part of the input unit 14 illustrated in FIG. 2, has a function of a touch-panel display to detect a touched position on the surface thereof, and accepts an operation of specifying a command by a user. That is, if the user touches the position of a GUI button of a predetermined command among GUI buttons of commands displayed on the content operation screen in order to specify the command, the display 27 detects the touched position and supplies the command corresponding to the GUI button displayed at the position to the transmitting unit 26.

The key input unit 28 corresponds to another part of the input unit 14 illustrated in FIG. 2 and includes a plurality of input keys. If the user operates one of the input keys, the key input unit 28 supplies the command corresponding to the operation to the transmitting unit 26. For example, the key input unit 28 includes an input key that is operated to display the content selection screen or the content operation screen on the display 27.

The command that has been input (specified) through an operation of the display 27 or the key input unit 28 is supplied to the transmitting unit 26 and is transmitted to the server 3 or the renderer 4 via the network 5.

FIG. 4 illustrates the display pattern table stored in the display pattern storing unit 24 illustrated in FIG. 3.

In the display pattern table, "display patterns" used to display the content operation screen on the display 27 are registered (set) while being associated with "categories" of content distributed by the server 3.

Each of the display patterns is display information including information about commands operable to the content and layout information about placement of input keys (GUI buttons) to input those commands on the display 27. The layout information can be described in a markup language represented by HTML (HyperText Markup Language) or XML (eXtensible Markup Language), for example. The layout information includes information of images displayed as the GUI buttons of the respective commands (data of the GUI buttons). The operation panel 25 displays the content operation screen on the display 27 based on the display pattern.

In the display pattern table illustrated in FIG. 4, "audio and visual", "only visual", and "only audio" are registered as categories. As the display pattern corresponding to the category "audio and visual", "display pattern for audio and visual", including information of commands operable to audio and visual content (e.g., play, stop, turn up/down the volume) and layout information to display those commands on the display 27, is registered. As the display pattern corresponding to the category "visual only", "display pattern for visual", including information of commands operable to visual content (e.g., play, stop, fast-rewind, and fast-forward) and layout information to display those commands on the display 27, is registered. As the display pattern corresponding to the category "audio only", "display pattern for audio", including information of commands operable to audio content (e.g., turn up/down the volume and turn up/down the bass) and layout information to display those commands on the display 27, is registered.

Herein, examples of categories of content are as follows: categories based on whether the content is a picture, voice, a still image, or a combination thereof; categories based on a difference in CODEC of the content; categories based on a difference in image resolution; categories based on the type of paid/free content; categories based on a difference in information to group content of video, television, radio, or games;

categories based on a difference in file attribute or file size; categories based on a difference in information indicating a physical installation site of a content providing apparatus; categories based on a difference in owner of the content; categories based on a difference in genre information; categories based on a difference in meta information of content used; and categories based on a difference in information of a usable renderer that is arbitrarily registered by a user with respect to the unit of each piece of content or groups of content generated based on respective pieces of information of the content.

Figure 5:
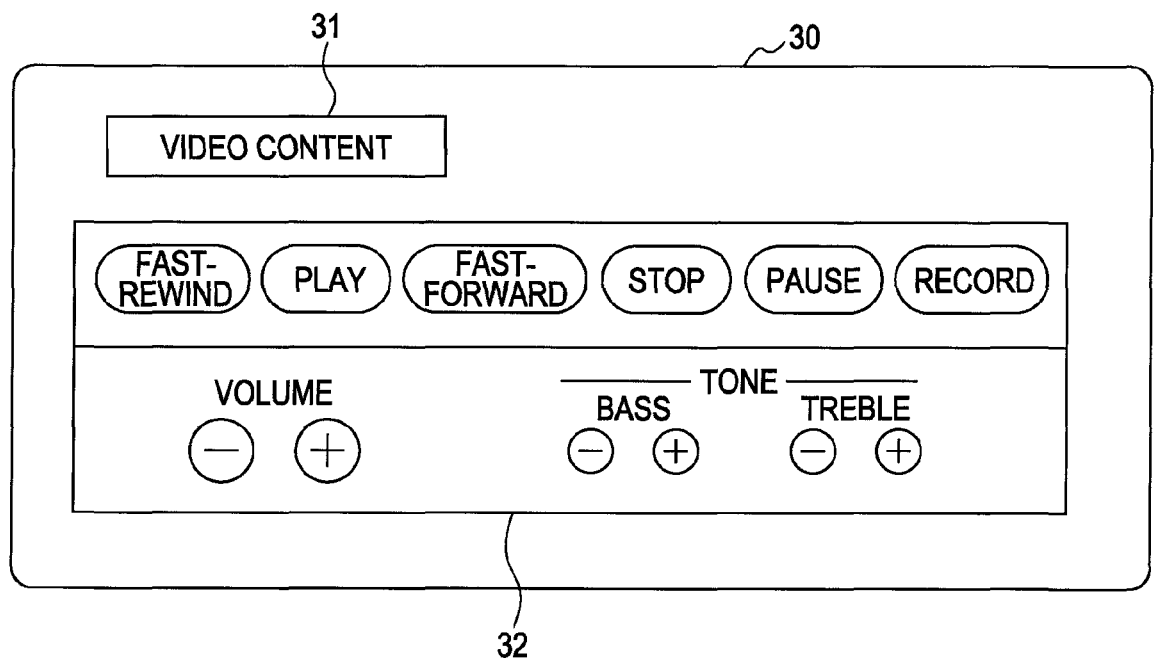
FIG. 5 illustrates a display example of a content operation screen 30 displayed on a display 27 illustrated in FIG. 3.

FIG. 5 illustrates a display example of the content operation screen 30 displayed on the display 27 illustrated in FIG. 3.

The content operation screen 30 includes a category display unit 31 and a GUI button display unit 32.

In the category display unit 31, the category of the content that is being played back in the renderer 4 is displayed. For example, "video content" is displayed in the category display unit 31 in FIG. 5, which indicates that the renderer 4 is playing back content of a video (audio and visual) category.

In the GUI button display unit 32, GUI buttons that are operated to input commands operable to the video content are displayed based on a display pattern.

In FIG. 5, GUI buttons of so-called running-related commands about running of pictures, such as fast-rewind, play, fast-forward, stop, pause, and record, are displayed on the upper side of the GUI button display unit 32. Also, GUI buttons of so-called volume-related commands about audio adjustment, such as turn up/down of the volume, turn up/down of the bass, and turn up/down of the treble, are displayed on the lower side of the GUI button display unit 32.

For example, when the renderer 4 is playing back content of the visual (visual only) category, "visual content" is displayed in the category display unit 31. At this time, only the GUI buttons of the running-related commands operable to the content of the visual category are displayed in the GUI button display unit 32.

Alternatively, the GUI buttons of the commands same as those for content of the video (audio and visual) category may be displayed in the GUI button display unit 32, and the GUI buttons of the running-related commands operable to content of the visual category may be highlighted while the GUI buttons of the volume-related commands not operable to content of the visual category may be grayed out.

The commands operable to content mean commands to provide instructions about handling that can be applied to the content to be played back. For example, assume that the renderer 4 is a hard disk recorder and that the commands to provide instructions about handling of content in the hard disk recorder include the running-related commands and the volume-related commands. Among these commands, when content of the visual (visual only) category is being played back in the hard disk recorder, the commands to provide instructions about handling that can be applied to the content of the visual (visual only) category played back at that time, that is, the running-related commends, are the commands operable to the content.

As described above, the display 27 has a function of a touch-panel display. For example, if the user touches with his/her finger the position of the GUI button of a fast-rewind command displayed in the GUI button display unit 32 (if the user operates the GUI button), the display 27 detects the touched position and supplies the fast-rewind command corresponding to the GUI button displayed at the detected position to the transmitting unit 26.

Figure 6:
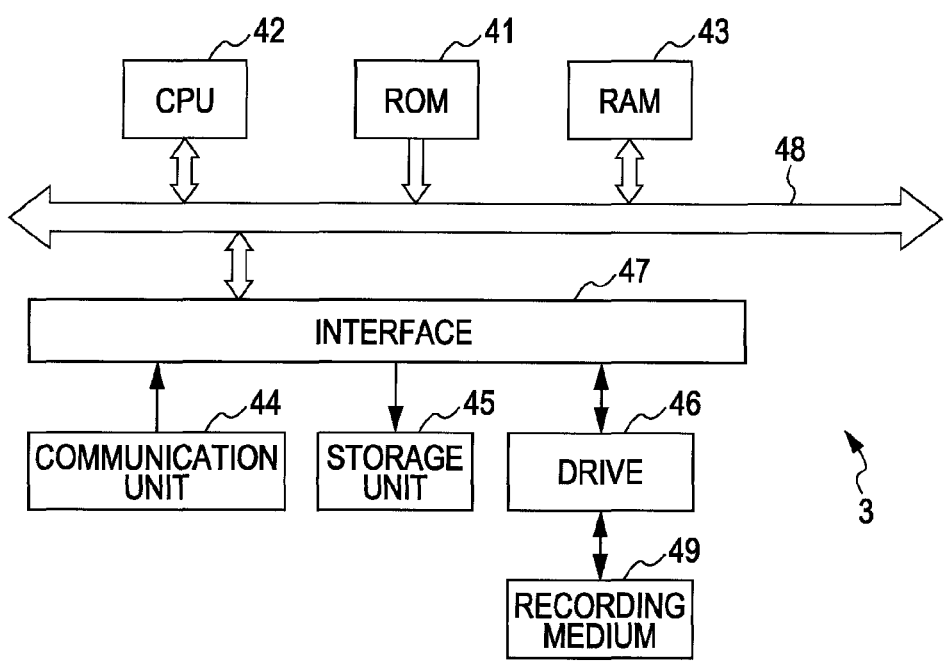
FIG. 6 is a block diagram of an example of a configuration of an embodiment of a server 3 illustrated in FIG. 1.

FIG. 6 is a block diagram of an example of a configuration of an embodiment of the server 3 illustrated in FIG. 1.

The server 3 includes a ROM 41, a CPU 42, a RAM 43, a communication unit 44, a storage unit 45, a drive 46, an interface 47, and a bus 48. The communication unit 44, the storage unit 45, and the drive 46 connect to the interface 47. The ROM 41, the CPU 42, the RAM 43, and the interface 47 are mutually connected via the bus 48.

The ROM 41 stores programs. The CPU 42 performs various processes by executing the programs. The RAM 43 appropriately stores the programs executed by the CPU 42 and necessary data.

The communication unit 44 is a communication interface to perform communication via a wireless LAN compatible with the standard of IEEE 802, and communicates with the renderer 4 via the network 5. The communication unit 44 receives a command transmitted from the renderer 4 via the network 5 and supplies it to the CPU 42 and distributes (transmits) content supplied from the storage unit 45 to the renderer 4 in accordance with control by the CPU 42. Also, the communication unit 44 can perform communication via another network, such as the Internet.

The storage unit 45 is a storage device, such as a hard disk, and stores a plurality of pieces of content distributed by the server 3. Also, the storage unit 45 supplies content stored therein to the communication unit 44 in accordance with control by the CPU 42. The content stored in the storage unit 45 can be downloaded from a download site via the Internet or via an artificial satellite for digital satellite broadcast.

A removable recording medium 49 can be loaded into the drive 46. For example, the drive 46 can read content recorded on the recording medium 49 and supply the content to the storage unit 45 in accordance with control by the CPU 42. Examples of the recording medium 49 include a flexible disk, a CD-ROM (compact disc read only memory), an MO (magneto-optical) disc, a DVD (digital versatile disc), a magnetic disk, and a semiconductor memory.

For example, if a command to request playing back content in the renderer 4 is transmitted from the renderer 4 to the server 3 via the network 5, the communication unit 44 receives the command and supplies it to the CPU 42 via the interface 47 and the bus 48. The CPU 42 searches for a requested piece of content to be played back among a plurality of pieces of content stored in the storage unit 45 based on the command and controls the storage unit 45 and the communication unit 44 so as to distribute the piece of content.

The renderer 4 plays back content distributed from the server 3 via the network 5. For example, the renderer 4 includes a monitor on which pictures are played back and a speaker to play back voice (not shown). The renderer 4 processes visual data included in the content so as to display pictures on the monitor, and processes audio data included in the content so as to output voice from the speaker. Also, the renderer 4 transmits/receives commands to/from the controller 2 or the server 3.

Figure 7:
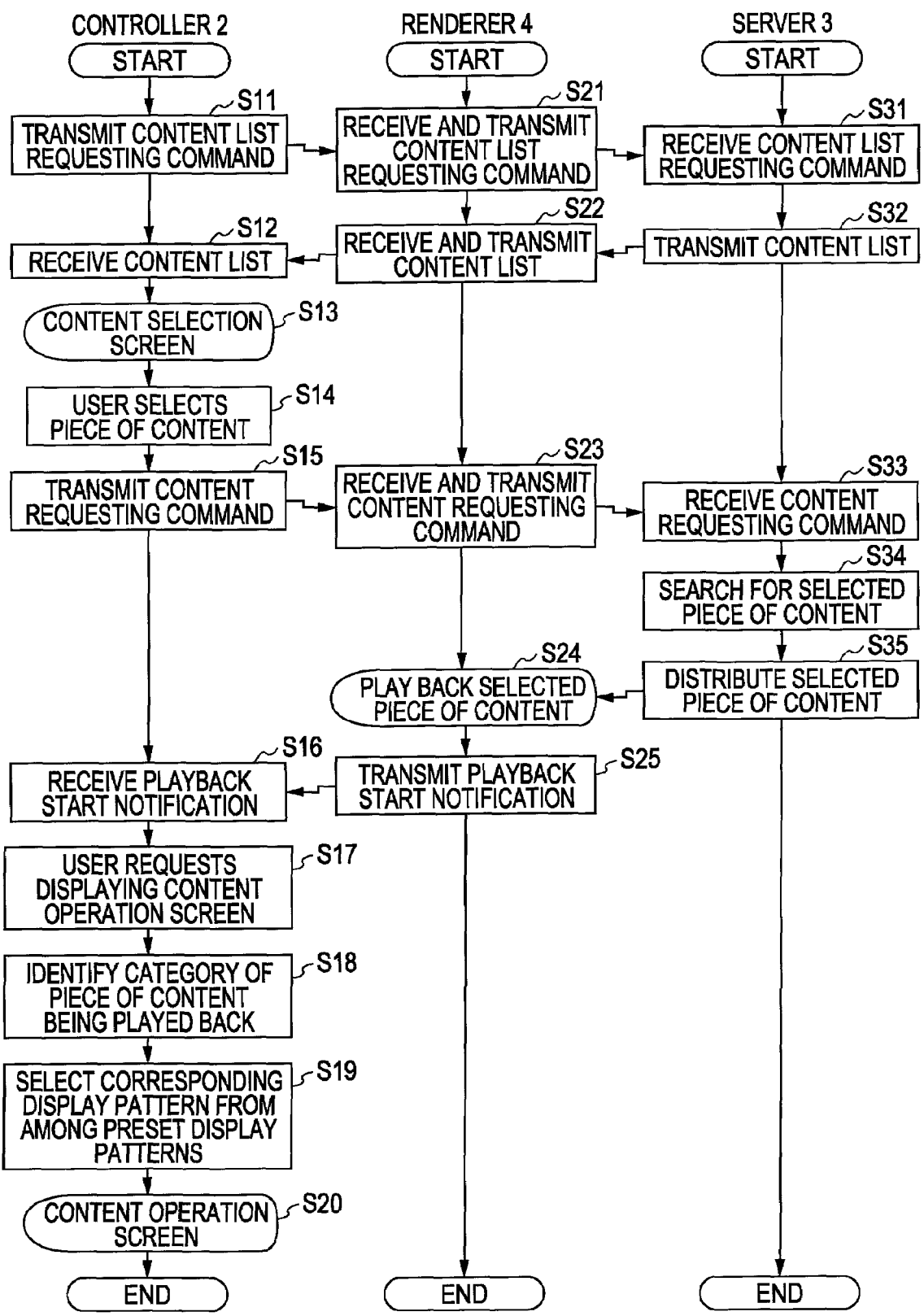
FIG. 7 is a flowchart illustrating an embodiment of a process performed by the content distributing system illustrated in FIG. 1.

FIG. 7 is a flowchart illustrating an embodiment of a process performed by the content distributing system illustrated in FIG. 1. Hereinafter, the process performed by the content distributing system after content has been selected in the controller 2 until the content operation screen is displayed on the display 27 of the operation panel 25 is described with reference to FIG. 7.

In step S11, after a user presses the input key to display the content selection screen on the display 27 among the plurality of input keys included in the key input unit 28 of the controller 2 (FIG. 3), the key input unit 28 supplies a content list requesting command to request transmission of a list of content stored in the server 3 to the controller 2 to the transmitting unit 26. The transmitting unit 26 transmits the content list requesting command to the renderer 4 via the network 5.

In step S21, the renderer 4 receives the content list requesting command transmitted by the transmitting unit 26 of the controller 2 in step S11 and transmits the command to the server 3 via the network 5.

In step S31, the communication unit 44 of the server 3 (FIG. 6) receives the content list requesting command transmitted by the renderer 4 in step S21 and supplies the content list requesting command to the CPU 42. The CPU 42 generates a content list including information of titles of a plurality of pieces of content stored in the storage unit 45 based on the content list requesting command and supplies the content list to the communication unit 44. Then, the process proceeds to step S32.

In step S32, the communication unit 44 transmits the content list supplied from the CPU 42 to the renderer 4 via the network 5.

In step S22, the renderer 4 receives the content list transmitted by the communication unit 44 of the server 3 in step S32 and transmits it to the controller 2 via the network 5.

In step S12, the receiving unit 21 of the controller 2 receives the content list transmitted from the renderer 4 and supplies it to the operation panel 25 via the identifying unit 22 and the selecting unit 23.

After the content list has been supplied to the operation panel 25, the process proceeds to step S13, where the operation panel 25 displays the content selection screen listing the titles of the plurality of pieces of content stored in the server 3 on the display 27 based on the content list.

After step S13, the process proceeds to step S14, where the user touches with his/her finger and specifies a position corresponding to a piece of content to be played back in the renderer 4 (hereinafter referred to as a selected piece of content) among the pieces of content whose titles are listed on the content selection screen displayed on the display 27 (touch-panel display), the display 27 selects the piece of content as the selected piece of content to be played back in the renderer 4 and supplies a command to request playback of the selected piece of content (hereinafter referred to as a content requesting command) to the transmitting unit 26.

After the content requesting command has been supplied from the operation panel 25 including the display 27 (touch-panel display) to the transmitting unit 26, the process proceeds to step S15, where the transmitting unit 26 transmits the content requesting command to the renderer 4 via the network 5.

In step S23, the renderer 4 receives the content requesting command transmitted by the transmitting unit 26 of the controller 2 in step S15 and transmits it to the server 3 via the network 5.

In step S33, the communication unit 44 of the server 3 (FIG. 6) receives the content requesting command transmitted by the renderer 4 in step S23. The communication unit 44 supplies the received content requesting command to the CPU 42, and then the process proceeds to step S34.

In step S34, the CPU 42 searches for the selected piece of content among the plurality of pieces of content stored in the storage unit 45 based on the content requesting command supplied from the communication unit 44.

After step S34, the process proceeds to step S35, where the storage unit 45 supplies the selected piece of content to the communication unit 44 in accordance with control by the CPU 42. The communication unit 44 distributes the selected piece of content supplied from the storage unit 45 to the renderer 4 via the network 5.

In step S24, the renderer 4 receives and plays back the selected piece of content distributed by the communication unit 44 of the server 3 in step S35.

After the renderer 4 has started playing back the selected piece of content, the process proceeds to step S25, where the renderer 4 transmits a playback start notification indicating that playback of the selected piece of content has started to the controller 2. The playback start notification transmitted by the renderer 4 includes information of the category of the selected piece of content.

In step S16, the receiving unit 21 of the controller 2 (FIG. 3) receives the playback start notification transmitted by the renderer 4 in step S25. The receiving unit 21 supplies the received playback start notification to the identifying unit 22.

Then, upon request for displaying the content operation screen from the user, that is, upon press of the input key to display the content operation screen on the display 27 among the plurality of input keys included in the key input unit 28 by the user, the key input unit 28 supplies a command to display the content operation screen on the display 27 (hereinafter referred to as an operation screen requesting command) to the identifying unit 22 via the selecting unit 23 in step S17.

After the identifying unit 22 has been supplied with the operation screen requesting command, the process proceeds to step S18, where the identifying unit 22 refers to the playback start notification supplied by the receiving unit 21 in step S16 in order to identify the category of the selected piece of content that is being played back in the renderer 4. The identifying unit 22 supplies the identification result to the selecting unit 23.

Alternatively, the identifying unit 22 can temporarily store the content requesting command supplied by the display 27 to the transmitting unit 26 in step S14 and identify the category of the selected piece of content by referring to the content requesting command.

After step S18, the process proceeds to step S19, where the selecting unit 23 selects a display pattern corresponding to the category of the selected piece of content from the display pattern table stored in the display pattern storing unit 24 based on the identification result supplied from the identifying unit 22. The selecting unit 23 supplies the selected display pattern to the operation panel 25, and the process proceeds to step S20.

In step S20, the operation panel 25 displays the content operation screen on the display 27 based on the display pattern supplied from the selecting unit 23. That is, as described above, the display pattern includes information of commands operable to the content and layout information about placement of displaying input keys (GUI buttons) to input those commands on the display 27. The operation panel 25 displays only the GUI buttons of the commands operable to the selected piece of content on the content operation screen in accordance with the layout information based on the display pattern.

Figure 8:
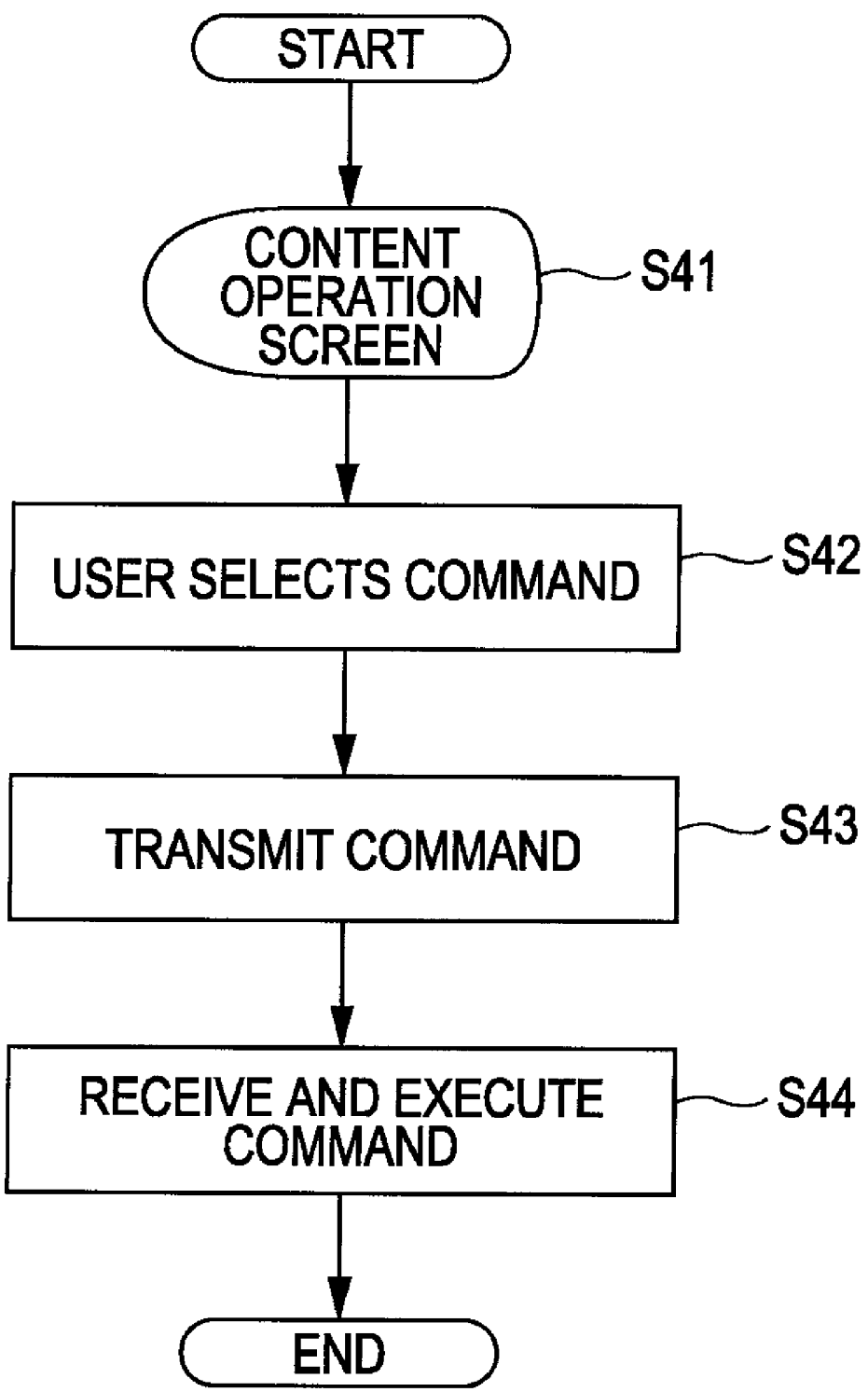
FIG. 8 is a flowchart illustrating a process performed by the content distributing system.

FIG. 8 is a flowchart illustrating a process performed by the content distributing system after the content operation screen has been displayed on the display 27 of the operation panel 25 until a command is executed.

In step S41, the controller 2 displays the content operation screen on the display 27 of the operation panel 25 in step S20 in FIG. 7, and the process proceeds to step S42. For example, a process of displaying the content operation screen including only the GUI buttons of the commands operable to the selected piece of content is performed, and the user recognizes the commands operable to the selected piece of content.

After the user has performed an operation of selecting and specifying a command applied to the content from among the commands on the content operation screen displayed on the display 27, the display 27 accepts the operation in step S42. That is, if the user touches the position of the GUI button of the command applied to the content among the GUI buttons on the content operation screen displayed on the display 27, the display 27 detects the touched position and supplies the command corresponding to the GUI button displayed at the position to the transmitting unit 26.

After the command specified by the user has been supplied from the display 27 to the transmitting unit 26, the process proceeds to step S43, where the transmitting unit 26 transmits the command specified by the user to the renderer 4 via the network 5.

In step S44, the renderer 4 receives the command transmitted from the transmitting unit 26 and executes the command.

As described above, the display 27 of the controller 2 displays only the GUI buttons of operable commands on the content operation screen, so that the user can easily find an appropriate function. Accordingly, operation mistakes of the controller 2 can be suppressed and the operability of the controller 2 can be improved.

FIG. 9 is a flowchart illustrating another embodiment of the process performed by the content distributing system illustrated in FIG. 1. Hereinafter, the process performed by the content distributing system after a piece of content has been selected in the controller 2 until the content operation screen is displayed on the display 27 of the operation panel 25, as in FIG. 7, is described with reference to FIG. 9.

In the process performed by the content distributing system illustrated in FIG. 9, the step of displaying the content selection screen (step S51) to the step of receiving a playback start notification (step S54) are the same as steps S13 to S16 in FIG. 7, and thus the corresponding description is omitted. Also, the steps of transmitting and receiving a content list requesting command and a content list are the same as steps S11 to S12 in FIG. 7, and thus the corresponding illustration and description are omitted.

That is, in the process performed by the content distributing system illustrated in FIG. 9, a process different from that performed by the content distributing system illustrated in FIG. 7 is performed from a step of requesting displaying the content operation screen by the user (step S55).

Upon request for displaying the content operation screen from the user, in step S55, the key input unit 28 of the controller 2 (FIG. 3) supplies an operation screen requesting command to the transmitting unit 26. The transmitting unit 26 transmits the operation screen requesting command to the renderer 4 via the network 5.

In step S64, the renderer 4 receives the operation screen requesting command transmitted by the transmitting unit 26 of the controller 2 in step S55 and transmits the command to the server 3 via the network 5.

In step S74, the communication unit 44 of the server 3 receives the operation screen requesting command transmitted by the renderer 4 in step S64, and the server 3 performs an operation panel information generating process. In the operation panel information generating process, the server 3 identifies the category of the selected piece of content that is being played back in the renderer 4, generates operation panel information used to display the content operation screen on the display 27 of the controller 2, and transmits the operation panel information to the renderer 4. The operation panel information generating process varies depending on the environment of the content distributing system, which is described below with reference to FIGS. 10 to 17.

In step S65, the renderer 4 receives the operation panel information transmitted by the communication unit 44 of the server 3 in step S74 and transmits the information to the controller 2 via the network 5.

In step S56, the receiving unit 21 of the controller 2 receives the operation panel information transmitted by the renderer 4 in step S65. The receiving unit 21 supplies the received operation panel information to the operation panel 25 via the identifying unit 22 and the selecting unit 23. Then, the process proceeds to step S57.

In step S57, the operation panel 25 generates the content operation screen to be displayed on the display 27 based on the operation panel information supplied from the receiving unit 21.

After step S57, the process proceeds to step S58, where the operation panel 25 displays the content operation screen on the display 27. As in the process performed by the content distributing system illustrated in FIG. 7, the content operation screen including only the commands operable to the selected piece of content is displayed on the display 27. After the content operation screen has been displayed on the display 27, the process performed by the content distributing system after the content operation screen has been displayed on the display 27 of the operation panel 25 until a command is executed (same process as in FIG. 8) is performed.

FIG. 10 is a flowchart illustrating an embodiment of the operation panel information generating process performed in step S74 in FIG. 9.

In this embodiment, the storage unit 45 of the server 3 illustrated in FIG. 6 stores a table as illustrated in FIG. 11, as well as content to be distributed. In this table, "category" and "pattern number" uniquely specifying the category are registered while being associated with each other. In the table illustrated in FIG. 11, "audio and visual", "visual only", and "audio only" are registered as categories. Also, "#01" is registered as the pattern number corresponding to the category "audio and visual", "#02" is registered as the pattern number corresponding to the category "visual only", and "#03" is registered as the pattern number corresponding to the category "audio only".

Figures 12, 13:
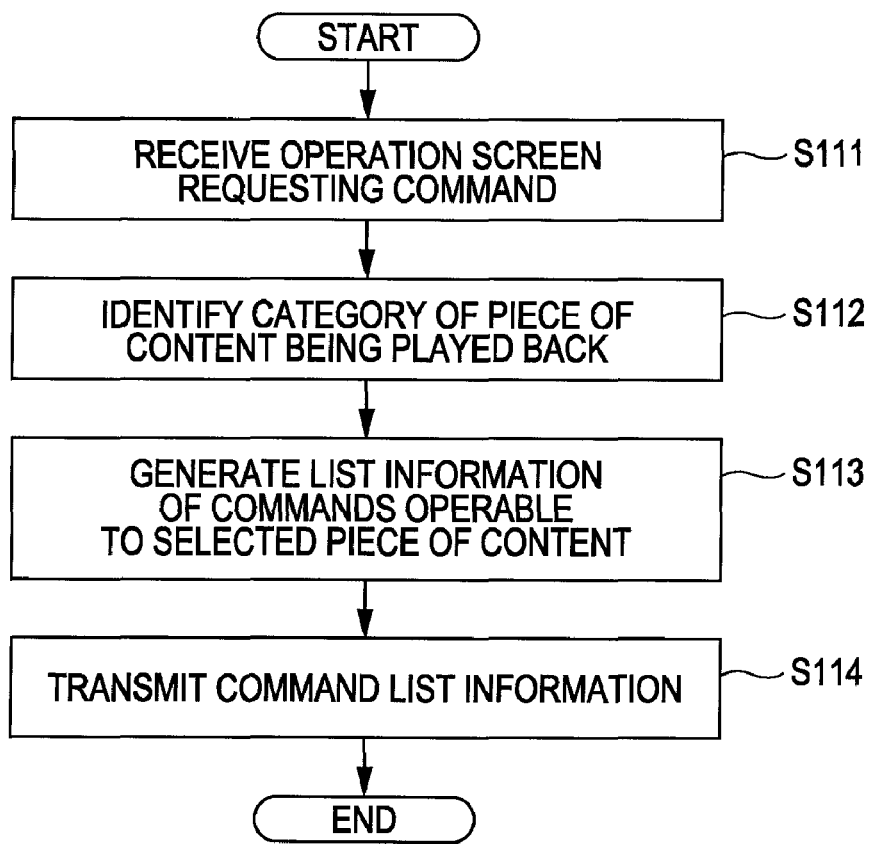
FIG. 12 illustrates a table in which pattern numbers and display patterns each corresponding to the category specified by one of the pattern numbers are registered while being associated with each other, the table being stored in the display pattern storing unit 24 of the controller 2 illustrated in FIG. 2.
FIG. 13 is a flowchart illustrating another embodiment of the operation panel information generating process.

The display pattern storing unit 24 of the controller 2 illustrated in FIG. 3 stores a table as illustrated in FIG. 12. In this table, "pattern number" and "display pattern" corresponding to the category specified by the pattern number are registered while being associated with each other. In the table illustrated in FIG. 12, "#01", "#02", and "#03" are registered as pattern numbers. Also, "display pattern for audio and visual" is registered as the display pattern corresponding to the pattern number "#01", "display pattern for visual" is registered as the display pattern corresponding to the pattern number "#02", and "display pattern for audio" is registered as the display pattern corresponding to the pattern number "#03". The "display pattern for audio and visual", "display pattern for visual", and "display pattern for audio" are the same as those described above with reference to FIG. 4.

In step S101, the communication unit 44 of the server 3 (FIG. 6) receives the operation screen requesting command transmitted by the renderer 4 in step S64 (FIG. 9). The communication unit 44 supplies the received operation screen requesting command to the CPU 42, and then the process proceeds to step S102.

In step S102, the CPU 42 refers to the content requesting command supplied in step S71 (FIG. 9) so as to identify the category of the selected piece of content that is being played back in the renderer 4.

After step S102, the process proceeds to step S103, where the CPU 42 refers to the table (FIG. 11) stored in the storage unit 45 so as obtain the pattern number corresponding to the category identified in step S102. For example, when content of the category "visual only" is being played back in the renderer 4, the CPU 42 obtains the pattern number "#02". The CPU 42 supplies the pattern number to the communication unit 44, and the process proceeds to step S104.

In step S104, the communication unit 44 transmits the pattern number, serving as operation panel information, supplied from the CPU 42 to the controller 2 via the network 5 and the renderer 4. After step S104, the operation panel information generating process performed by the server 3 ends.

The pattern number transmitted as the operation panel information from the server 3 is received (step S56 in FIG. 9) by the receiving unit 21 of the controller 2 (FIG. 3) and is supplied from the receiving unit 21 to the selecting unit 23 via the identifying unit 22. The selecting unit 23 selects the display pattern corresponding to the selected piece of content from the table (FIG. 12) stored in the display pattern storing unit 24 based on the pattern number and supplies the display pattern to the operation panel 25. For example, when pattern number supplied from the receiving unit 21 is "#02", the selecting unit 23 selects "display pattern for visual". The operation panel 25 generates the content operation screen based on the display pattern (step S57 in FIG. 9) and displays the content operation screen on the display 27 (step S58 in FIG. 9).

In this embodiment, the CPU 42 of the server 3 (FIG. 6) identifies the category of the selected piece of content that is being played back in the renderer 4, and thus the controller 2 (FIG. 3) need not include the identifying unit 22.

The renderer 4 may include the same blocks as those of the server 3 illustrated in FIG. 6, that is, the CPU 42, the communication unit 44, the storage unit 45, and so on. In that case, the renderer 4 can perform the operation panel information generating process (step S74 in FIG. 9).

In that case, after the controller 2 transmits the operation screen requesting command to the renderer 4, the communication unit of the renderer 4 receives the operation screen requesting command (same as step S101). Then, the CPU of the renderer 4 identifies the category of the selected piece of content (same as step S102) and obtains the pattern number by referring to the table (FIG. 11) stored in the storage unit of the renderer 4 (same as step S103). Then, the communication unit of the renderer 4 transmits the pattern number, serving as the operation panel information, to the controller 2 (same as step S104).

FIG. 13 is a flowchart illustrating another embodiment of the operation panel information generating process performed in step S74 in FIG. 9.

In this embodiment, the storage unit 45 of the server 3 illustrated in FIG. 6 stores a table as illustrated in FIG. 14, as well as content to be distributed. In this table, "category" and "all commands corresponding to the category" are registered while being associated with each other. In the table illustrated in FIG. 14, "audio and visual", "visual only", and "audio only" are registered as categories. Also, "running-related commands and volume-related commands" is registered as all commands corresponding to the category "audio and visual", "running-related commands" is registered as all commands corresponding to the category "visual only", and "volume-related commands" is registered as all commands corresponding to the category "audio only". The running-related commands and volume-related commands are the same as those described above with reference to FIG. 5.

On the other hand, the display pattern storing unit 24 of the controller 2 illustrated in FIG. 3 stores a table as illustrated in FIG. 15. In this table, "command" and "data of GUI button" corresponding to the command are registered while being associated with each other. In the table illustrated in FIG. 15, "play", "stop", and "fast-forward" are registered as commands. Also, "data of GUI button of play" is registered as data of the GUI button corresponding to the command "play", "data of GUI button of stop" is registered as data of the GUI button corresponding to the command "stop", and "data of GUI button of fast-forward" is registered as data of the GUI button corresponding to the command "fast-forward". The data of the GUI button corresponding to the command is information of an image as illustrated in FIG. 5, that is, the name of command surrounded by an ellipse.

In step S111 or S112, as in step S101 or S102 in FIG. 10, the communication unit 44 of the server 3 (FIG. 6) receives the operation screen requesting command, and the CPU 42 identifies the category of the selected piece of content that is being played back in the renderer 4.

In step S113, the CPU 42 refers to the table (FIG. 14) stored in the storage unit 45 so as to extract the commands operable to the selected piece of content from among all commands corresponding to the category identified in step S112, and generates list information of the extracted commands. For example, when content of the category "visual only" is being played back in the renderer 4, the CPU 42 generates list information of commands by using "running-related commands". The CPU 42 supplies the command list information to the communication unit 44, and the process proceeds to step S114.

In step S114, the communication unit 44 transmits the command list information, serving as the operation panel information, supplied from the CPU 42 to the controller 2 via the network 5 and the renderer 4. After step S114, the operation panel information generating process performed by the server 3 ends.

The command list information transmitted as the operation panel information from the server 3 is received (step S56 in FIG. 9) by the receiving unit 21 of the controller 2 (FIG. 3) and is supplied from the receiving unit 21 to the selecting unit 23 via the identifying unit 22. The selecting unit 23 selects data of the GUI button of the command corresponding to the selected piece of content from the table (FIG. 15) stored in the display pattern storing unit 24 based on the command list information, and supplies the data to the operation panel 25. For example, when the command list information supplied from the receiving unit 21 includes a command of "play", the selecting unit 23 selects "data of GUI button of play". The operation panel 25 generates the content operation screen based on the data of the GUI button (step S57 in FIG. 9) and displays the content operation screen on the display 27 (step S58 in FIG. 9). Only the GUI buttons of the commands corresponding to the selected piece of content are displayed on the display 27.

In this embodiment, the CPU 42 of the server 3 (FIG. 6) identifies the category of the selected piece of content that is being played back in the renderer 4, and thus the controller 2 (FIG. 3) need not include the identifying unit 22.

For example, in the operation panel 25, the GUI buttons of all commands may be displayed on the content operation screen at default. When the command list information transmitted as the operation panel information from the server 3 is supplied from the receiving unit 21 to the operation panel 25 via the identifying unit 22 and the selecting unit 23, the content operation screen may be generated such that the GUI buttons of the commands included in the command list information are highlighted while the GUI buttons of the commands not included in the command list information are grayed out. Then, this content operation screen is displayed on the display 27.

In the case where the operation panel 25 generates the content operation screen, the controller 2 (FIG. 3) need not include the identifying unit 22, the selecting unit 23, and the display pattern storing unit 24.

Figure 16:
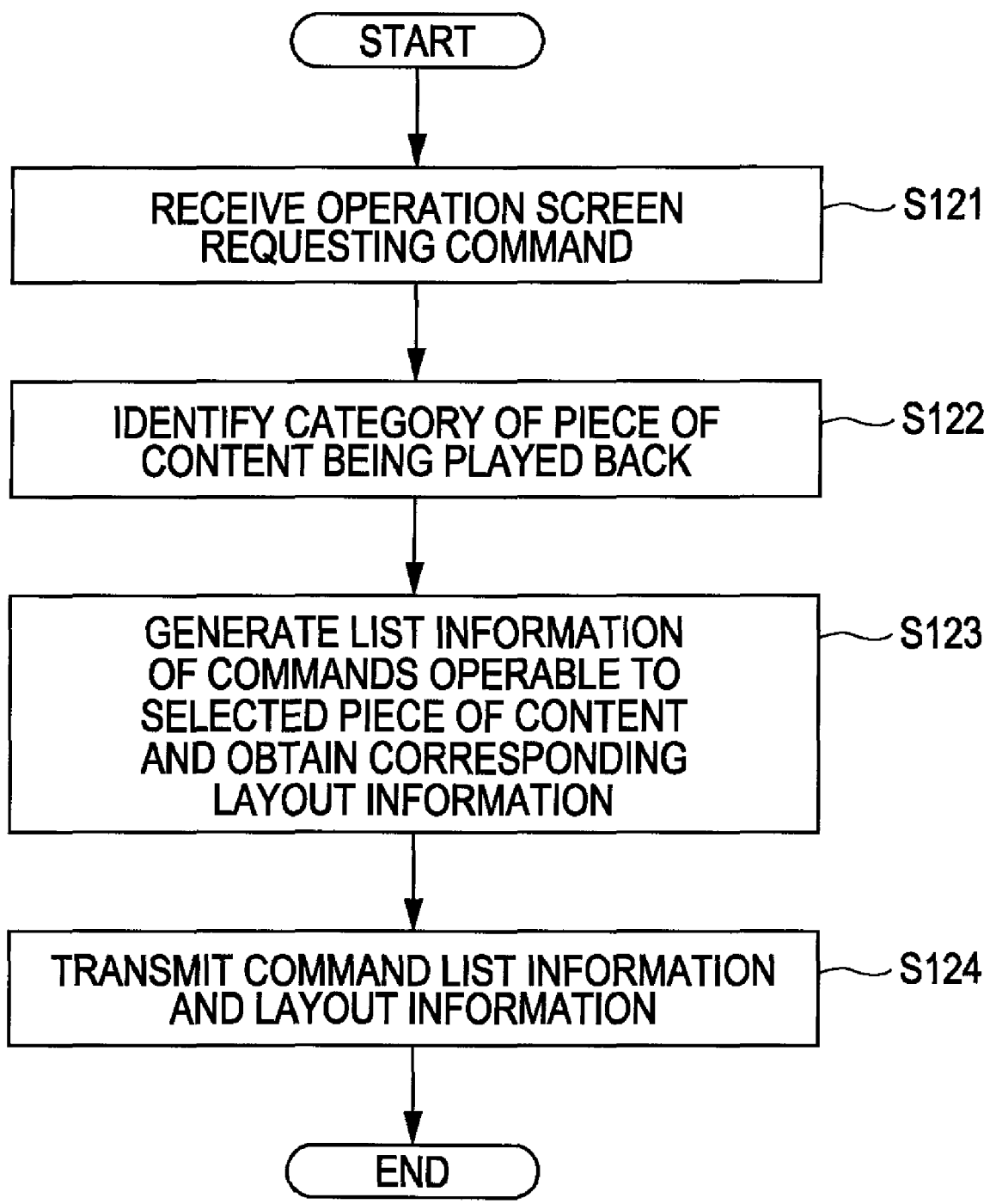
FIG. 16 is a flowchart illustrating still another embodiment of the operation panel information generating process.

FIG. 16 is a flowchart illustrating still another embodiment of the operation panel information generating process performed in step S74 in FIG. 9.

Figures 17, 18:
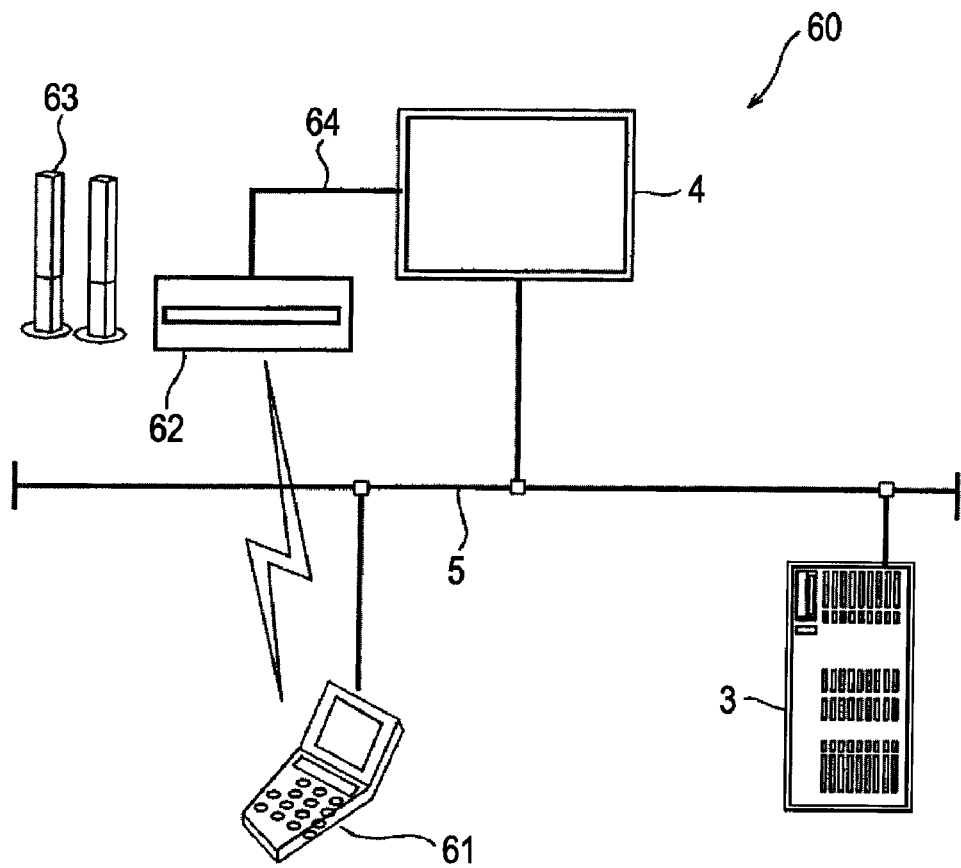
FIG. 17 illustrates a table in which categories and layout information corresponding to each of the categories are registered while being associated with each other, the table being stored in the storage unit 45 of the server 3 illustrated in FIG. 6.
FIG. 18 illustrates an example of a configuration of another embodiment of the content distributing system to which the present invention is applied.

In this embodiment, the storage unit 45 of the server 3 illustrated in FIG. 6 stores a table as illustrated in FIG. 17, in which "category" and "layout information" corresponding to the category are registered while being associated with each other and the table illustrated in FIG. 14, in which category and all commands corresponding to the category are registered while being associated with each other, as well as content to be distributed. The layout information can be described in a markup language represented by HTML or XML.

In the table illustrated in FIG. 17, "audio and visual", "visual only", and "audio only" are registered as categories. Also, "layout information for audio and visual" is registered as the layout information corresponding to the category "audio and visual", "layout information for visual" is registered as the layout information corresponding to the category "visual only", and "layout information for audio" is registered as the pattern number corresponding to the category "audio only".

For example, the layout information for audio and visual is information to display the GUI buttons of the running-related commands and the volume-related commands in the placement as in the GUI button display unit 32 illustrated in FIG. 5 (data of the GUI buttons and data of the placement). The layout information for visual is information to display only the GUI buttons of the running-related commands in the GUI button display unit 32 illustrated in FIG. 5. The layout information for audio is information to display only the GUI buttons of the volume-related commands in the GUI button display unit 32 illustrated in FIG. 5.

In step S121 or S122, as in step S101 or S102 in FIG. 10, the communication unit 44 of the server 3 (FIG. 6) receives the operation screen requesting command and the CPU 42 identifies the category of the selected piece of content that is being played back in the renderer 4.

In step S123, as in step S113 (FIG. 13), the CPU 42 generates command list information and refers to the table (FIG. 17) stored in the storage unit 45 in order to obtain the layout information corresponding to the category identified in step S122. For example, when content of the category "audio and visual" is being played back in the renderer 4, the CPU 42 generates command list information by using "running-related commands of and volume-related commands" and obtains "layout information for audio and visual". The CPU 42 supplies the command list information and the layout information to the communication unit 44, and then the process proceeds to step S124.

In step S124, the communication unit 44 transmits the command list information and the layout information, which serve as the operation panel information, supplied from the CPU 42 to the controller 2 via the network 5 and the renderer 4. After step S124, the operation panel information generating process performed by the server 3 ends.

The command list information and the layout information transmitted as the operation panel information from the server 3 are received by the receiving unit 21 of the controller 2 (FIG. 3) (step S56 in FIG. 9), and are supplied from the receiving unit 21 to the operation panel 25 via the identifying unit 22 and the selecting unit 23. The operation panel 25 generates the content operation screen based on the command list information and the layout information (step S57 in FIG. 9) and displays the content operation screen on the display 27 (step S58 in FIG. 9). For example, when the command list information supplied from the receiving unit 21 includes the command of "play" and when "layout information for audio and visual" is supplied from the receiving unit 21, the operation panel 25 generates the content operation screen in which the GUI button of the command of play is placed based on the layout information for audio and visual.

In this way, the operation panel 25 generates the content operation screen in accordance with the command list information and the layout information transmitted from the server 3, so that the content operation screen that is designed desirably by the server 3 or that has a desirable placement of GUI buttons can be displayed.

In the case where the operation panel 25 generates the content operation screen based on the command list information and the layout information transmitted as operation panel information from the server 3, the controller 2 (FIG. 3) need not include the identifying unit 22, the selecting unit 23, and the display pattern storing unit 24.

FIG. 18 illustrates an example of a configuration of another embodiment of the content distributing system to which the present invention is applied.

The content distributing system 60 illustrated in FIG. 18 includes a controller 61, the server 3, the renderer 4, the network 5, an amplifier 62, a speaker 63, and an audio cable 64. As in the content distributing system 1 illustrated in FIG. 1, the controller 61, the server 3, and the renderer 4 are mutually connected via the network 5. The renderer 4 connects to the amplifier 62 via the audio cable 64, and the amplifier 62 connects to the speaker 63.

The amplifier 62 is a playback apparatus that is not compatible with connection by the network 5, and connects to the renderer 4 independently from the network 5. That is, an audio output terminal of the renderer 4 connects to an external input terminal of the amplifier 62 via the audio cable 64.

When content including audio data is to be played back in the content distributing system 60, the amplifier 62 is supplied with the audio data of the content from the renderer 4 via the audio cable 64 and processes the audio data, so that voice is output through the speaker 63.

For example, when content of the video (audio and visual) category is to be played back, the renderer 4 processes visual data of the content so as to display (play back) pictures, while the amplifier 62 processes audio data of the content so as to output (play back) voice through the speaker 63. Also, the amplifier 62 can receive a command transmitted by using infrared radiation from the controller 61.

Figure 19:
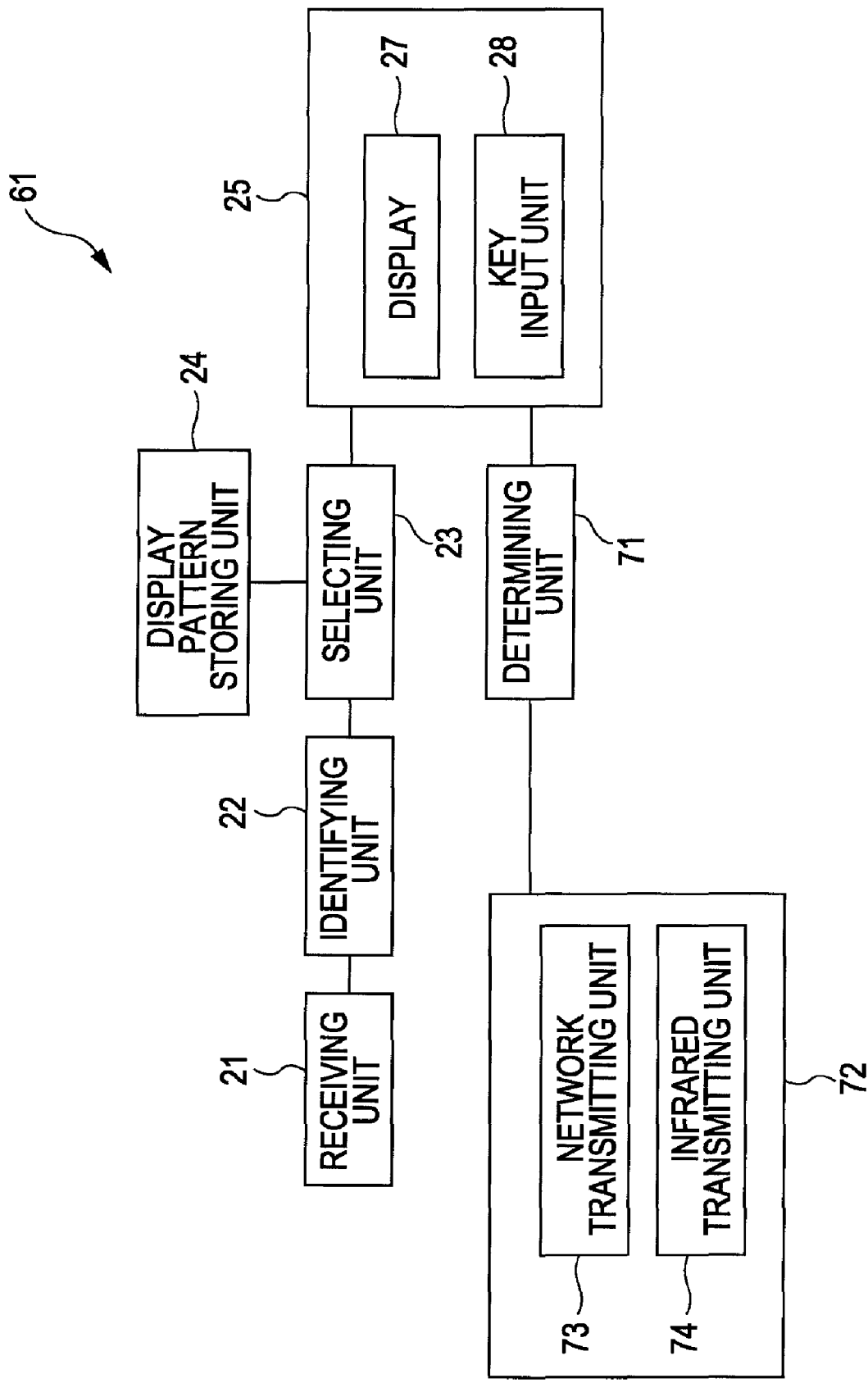
FIG. 19 is a block diagram of an example of a functional configuration of a controller 61 illustrated in FIG. 18.

FIG. 19 is a block diagram of an example of a function configuration of the controller 61 illustrated in FIG. 18.

In the controller 61, the receiving unit 21, the identifying unit 22, the selecting unit 23, the display pattern storing unit 24, the operation panel 25, the display 27, and the key input unit 28 are the same as those in the controller 2 illustrated in FIG. 3, and thus the corresponding description is omitted.

In the controller 61, the operation panel 25 connects to a determining unit 71, and the determining unit 71 connects to a transmitting unit 72. The transmitting unit 72 includes a network transmitting unit 73 to transmit commands via the network 5 and an infrared transmitting unit 74 to transmit commands by using infrared radiation.

The display pattern storing unit 24 of the controller stores the display pattern table (FIG. 4), as described above. Each of the display patterns registered in the display pattern table includes information of the commands operable to the content and layout information about placement for displaying input keys (GUI buttons) to input those commands on the display 27. The controller 61 can register (set) in advance a command to allow the amplifier to process audio data of content in the information of the commands operable to the content included in the display patterns.

The renderer 4 can transmit a playback start notification including the information that audio data of the content is processed by the amplifier 62 to the controller 61 (e.g., step S25 in FIG. 7).

When the playback start notification includes the information that audio data of the content is processed by the amplifier 62, the selecting unit 23 selects the display pattern in which the command to allow the amplifier 62 to process audio data of the content is registered and supplies the display pattern to the operation panel 25.

The operation panel 25 displays the content operation screen on the display 27 based on the display pattern supplied from the selecting unit 23. For example, when content of the video (audio and visual) category is played back as in the content operation screen 30 illustrated in FIG. 5, the GUI buttons of the commands (running-related commands) to allow the renderer 4 to process visual data of the content are displayed on the upper side of the GUI button display unit 32, while the GUI buttons of the commands (volume-related commands) to allow the amplifier 62 to process audio data of the content are displayed on the lower side of the GUI button display unit 32.

The determining unit 71 determines whether the command is to be transmitted via the network 5 or by using infrared radiation, and supplies the command to any one of the network transmitting unit 73 and the infrared transmitting unit 74 of the transmitting unit 72.

For example, when the determining unit 71 is supplied with a command to allow the amplifier 62 to process audio data of the content from the operation panel 25, the determining unit 71 determines that the command is to be transmitted by using infrared radiation and supplies the command to the infrared transmitting unit 74. Then, the infrared transmitting unit 74 transmits the command supplied from the determining unit 71 to the amplifier 62 by using infrared radiation.

On the other hand, when the determining unit 71 is supplied with a command to allow the renderer 4 to process visual data of the content from the operation panel 25, the determining unit 71 determines that the command is to be transmitted by via the network 5 and supplies the command to the network transmitting unit 73. Then, the network transmitting unit 73 transmits the command supplied from the determining unit 71 to the renderer 4 via the network 5.

The controller 61 can be provided with a command code set including commands to operate various types of AV (audio visual) apparatuses, such as the amplifier 62 and a DVD (digital versatile disc) player, and can also be provided with a mechanism to specify the command code set of the amplifier 62 from this command code set. By using such a command code set, the controller 61 can register a command to allow the amplifier 62 to process audio data of content in the display patterns.

In the content distributing system 60 having the above-described configuration, after the controller 61 has transmitted a content requesting command (e.g., step S15 in FIG. 7) and after the renderer 4 has started playback of the selected piece of content (e.g., step S24 in FIG. 7), if the user requests displaying the content operation screen, the content operation screen displaying the GUI buttons of the commands to allow the renderer 4 to process visual data of the content (hereinafter referred to as the GUI buttons of the renderer 4) and the GUI buttons of the commands to allow the amplifier 62 to process audio data of the content (hereinafter referred to as the GUI buttons of the amplifier 62) is displayed on the display 27.

Figure 20:
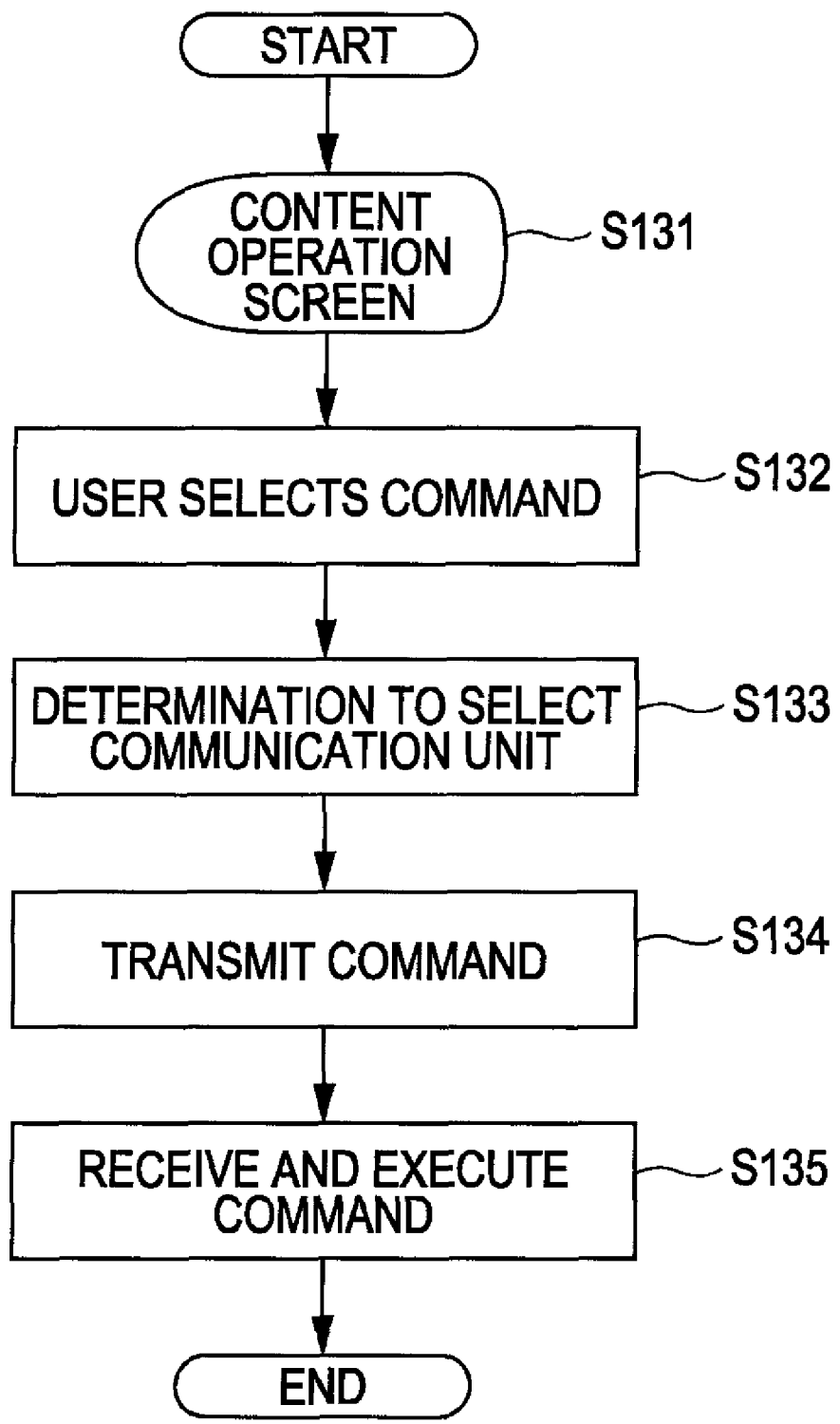
FIG. 20 is a flowchart illustrating a process performed by the content distributing system.

FIG. 20 is a flowchart illustrating a process performed by the content distributing system after the content operation screen has been displayed on the display 27 of the operation panel 25 until a command is executed.

In step S131, the operation panel 25 of the controller displays the content operation screen, displaying the GUI buttons of the renderer 4 and the GUI buttons of the amplifier 62, on the display 27, as described above. Then, the process proceeds to step S132.

After a user has selected a command to be executed on the content from among the commands displayed on the content operation screen displayed on the display 27, the display 27 supplies the command to the determining unit 71 in step S132. Then, the process proceeds to step S133.

In step S133, the determining unit 71 determines whether the command is to be transmitted via the network 5 or by using infrared radiation. That is, when the determining unit 71 is supplied with a command that is input through an operation of the GUI button of the renderer 4 by the user from the display 27, the determining unit 71 determines to transmit the command via the network 5. On the other hand, when the determining unit 71 is supplied with a command that is input through an operation of the GUI button of the amplifier 62 by the user from the display 27, the determining unit 71 determines to transmit the command by using infrared radiation.

If the determining unit 71 determines in step S133 to transmit the command via the network 5, the determining unit supplies the command to the network transmitting unit 73. Then, the process proceeds to step S134, where the network transmitting unit 73 transmits the command supplied from the determining unit 71 to the renderer 4 via the network 5, and the process proceeds to step S135. In step S135, the renderer 4 receives and executes the command transmitted from the network transmitting unit 73.

More specifically, for example, the network transmitting unit 73 transmits the command that has been supplied from the determining unit 71 and that is compatible with the guideline of DLNA (Digital Living Network Alliance) to the renderer 4 via the network 5. The command need not always be compatible with the guideline of DLNA. For example, the controller 61 (the network transmitting unit 73) may transmit a command that has been supplied from the determining unit 71 and that is compatible with another standard or guideline, such as UPnP (Universal Plug and Play), to the renderer 4 via the network 5.

Furthermore, the controller 61 may transmit a command corresponding to an infrared command, which is a command using infrared radiation as a medium, to the renderer 4 via the network 5. Herein, the command corresponding to an infrared command may specify one infrared command. For example, the command corresponding to an infrared command may be a command including a value indicating a blinking pattern of the infrared command, a command including an ID specifying the infrared command, or a command including data indicating a maker, an apparatus, or an operation indicated by the infrared command.

On the other hand, if the determining unit 71 determines in step S133 to transmit the command by using infrared radiation, the determining unit 71 supplies the command to the infrared transmitting unit 74. Then, the process proceeds to step S134, where the infrared transmitting unit 74 transmits the command supplied from the determining unit 71 to the amplifier 62 by using infrared radiation, and the process proceeds to step S135. In step S135, the amplifier 62 receives and executes the command transmitted from the infrared transmitting unit 74.

As described above, the GUI buttons of the renderer 4 and the GUI buttons of the amplifiers 62 are displayed on the content operation screen. Accordingly, the user can easily understand that he/she operates the GUI button of the amplifier 62 in order to adjust the volume of content and operates the GUI button of the renderer 4 in order to operate running of pictures, that is, in order to play back the content or pause.

When a command is input through an operation of the GUI button of the amplifier 62, the controller 61 may transmit the command to the renderer 4 via the network 5, and the renderer 4 may transmit the command to the amplifier 62 via the audio cable 54.

Alternatively, the transmitting unit 72 of the controller 61 and the amplifier 62 may include a connector to connect a cable for communication, the transmitting unit 72 and the amplifier 62 may be connected to each other via the cable for communication, and a command (e.g., a command equivalent to a command transmitted from the infrared transmitting unit 74 by using infrared radiation) may be transmitted via the cable for communication.

Figure 21:
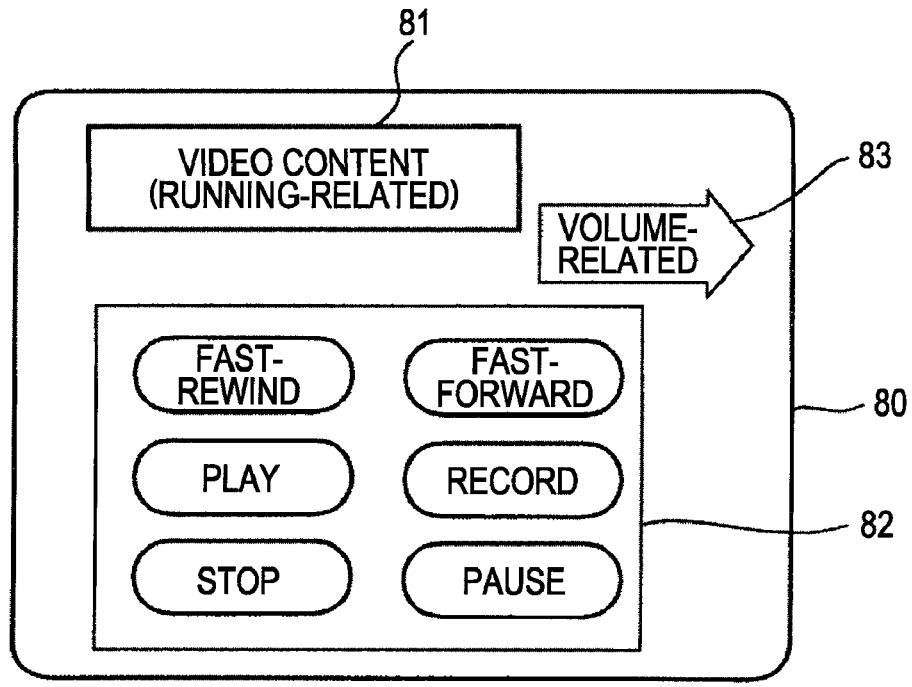
FIG. 21 illustrates a display example of a content operation screen 80 displayed on a display 27 illustrated in FIG. 19.
Figure 22:
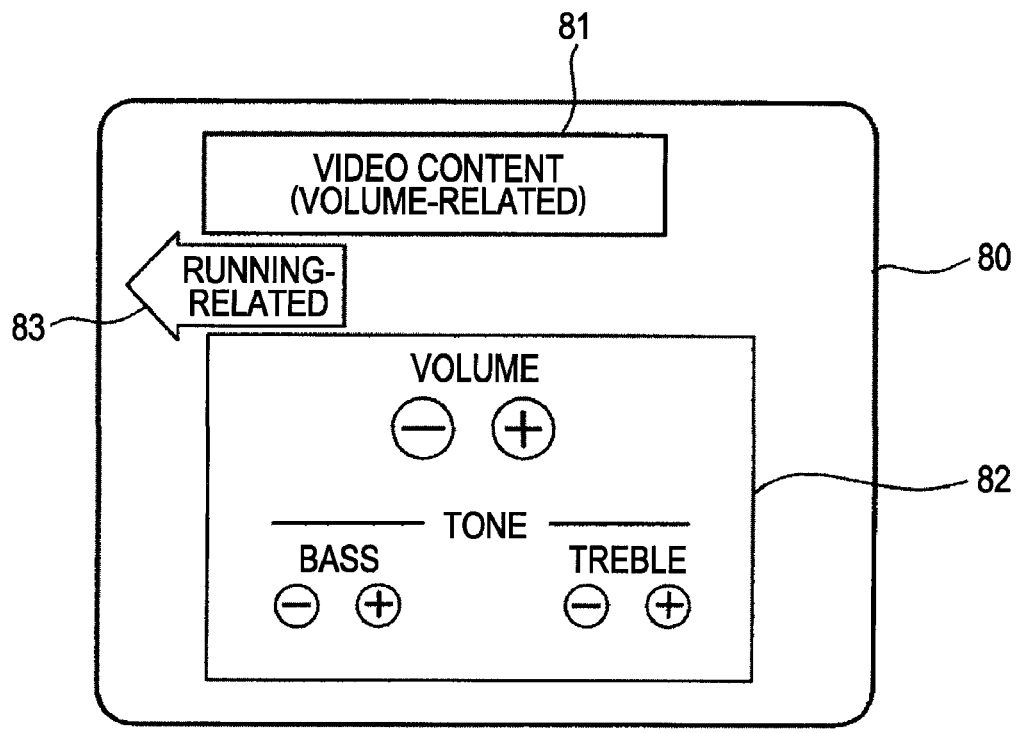
FIG. 22 illustrates a display example of the content operation screen 80 displayed on the display 27 illustrated in FIG. 19.

FIGS. 21 and 22 illustrate display examples of the content operation screen displayed on the display 27 illustrated in FIG. 19.

A content operation screen 80 includes a category display unit 81, a GUI button display unit 82, and a screen switching GUI button 83.

In the category display unit 81, the category of the content that is being played back in the renderer 4 is displayed, and also the type of GUI buttons displayed on the content operation screen 80 is displayed. For example, in FIG. 21, "video content (running-related)" is displayed in the category display unit 81. This indicates that the renderer 4 is playing back the content of the video category and that the running-related GUI buttons are displayed on the content operation screen 80.

In FIG. 22, "video content (volume-related)" is displayed in the category display unit 81. This indicates that the renderer 4 is playing back the content of the video category and that the volume-related GUI buttons are displayed on the content operation screen 80.

In the GUI button display unit 82, GUI buttons of the running-related commands are displayed in FIG. 21, while GUI buttons of the volume-related commands are displayed in FIG. 22.

The screen switching GUI button 83 is a GUI button to switch display in the GUI button display unit 82. For example, in FIG. 21, "volume-related" is displayed on the screen switching GUI button 83. If the user touches the screen switching GUI button 83, the display in the GUI button display unit 82 changes so that GUI buttons of the volume-related commands are displayed in the manner shown in the GUI button display unit 82 in FIG. 22.

In FIG. 22, "running-related" is displayed on the screen switching GUI button 83. If the user touches the screen switching GUI button 83, the display in the GUI button display unit 82 changes so that GUI buttons of the running-related commands are displayed in the manner shown in the GUI button display unit 82 in FIG. 21.

In this way, the content operation screen 80 is configured so that the display in the GUI button display unit 82 can be switched in accordance with the functions of the GUI buttons. With this configuration, a favorable operability can be obtained even if the display 27 of the controller 61 is small.

Furthermore, the display in the GUI button display unit 82 can be easily switched by using the screen switching GUI button 83.

Alternatively, two displays may be provided in the controller 61. In that case, GUI buttons of the running-related commands may be displayed on one of the displays, and GUI buttons of the volume-related commands may be displayed on the other display.

For example, when the render 4 processes visual data of content so as to play back pictures and when the amplifier 62 processes audio data of content so as to play back voice as in the content distributing system 60 illustrated in FIG. 18, the controller 61 can display the GUI buttons of the renderer 4 on one of the displays and display the GUI buttons of the amplifier 62 on the other display.

In the above description about the example illustrated in FIG. 18, the controller 61 transmits a command using infrared radiation as a medium to the amplifier 62. Alternatively, a command corresponding to an infrared command, which is a command using infrared radiation as a medium, may be transmitted via the network, and an apparatus received this command may transmit an infrared command, that is, emit infrared radiation serving as an infrared command.

Figure 23:
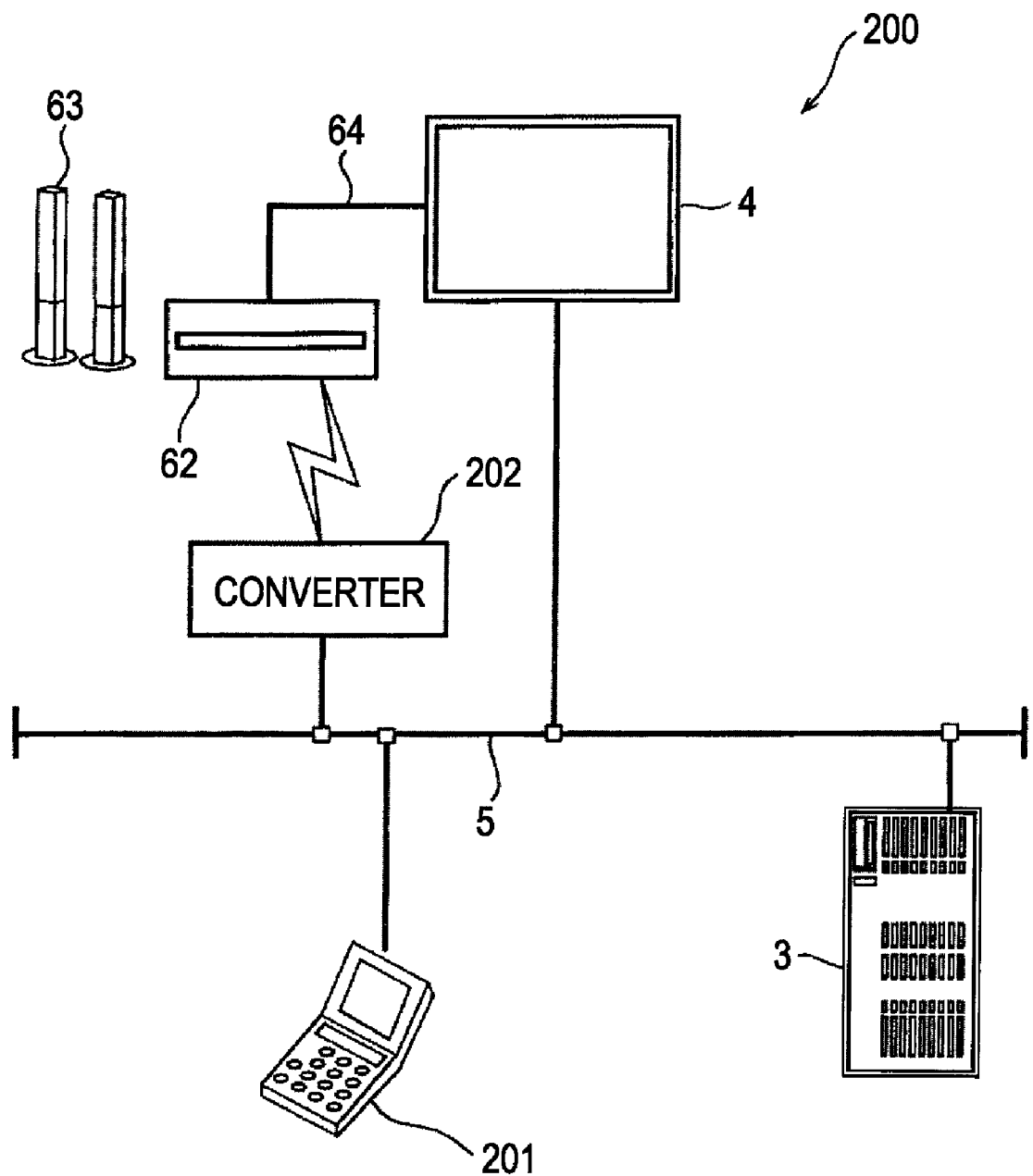
FIG. 23 illustrates an example of a configuration of still another embodiment of the content distributing system to which the present invention is applied.

FIG. 23 illustrates an example of a configuration of still another embodiment of the content distributing system to which the present invention is applied. The parts same as those in FIG. 18 are denoted by the same reference numerals, and the corresponding description is omitted.

In the content distributing system 200, a controller 201 transmits a command corresponding to an infrared command to a converter 202 via the network 5. Herein, the command corresponding to an infrared command that is transmitted from the controller 201 to the converter 202 via the network 5 may be a command capable of specifying one infrared command. For example, the controller 201 transmits a command corresponding to an infrared command, that is, a command including a value indicating a blinking pattern of the infrared command, a command including an ID specifying the infrared command, or a command including data indicating a maker, an apparatus, or an operation indicated by the infrared command, to the converter 202 via the network 5.

The converter 202 receives the command corresponding to an infrared command transmitted from the controller 201 via the network 5. The converter 202 transmits an infrared command based on the received command. That is, the converter 202 emits infrared radiation serving as an infrared command based on the received command.

An independent apparatus may be used as the converter 202, but the converter 202 may be realized as a function of part of an apparatus.

Figure 24:
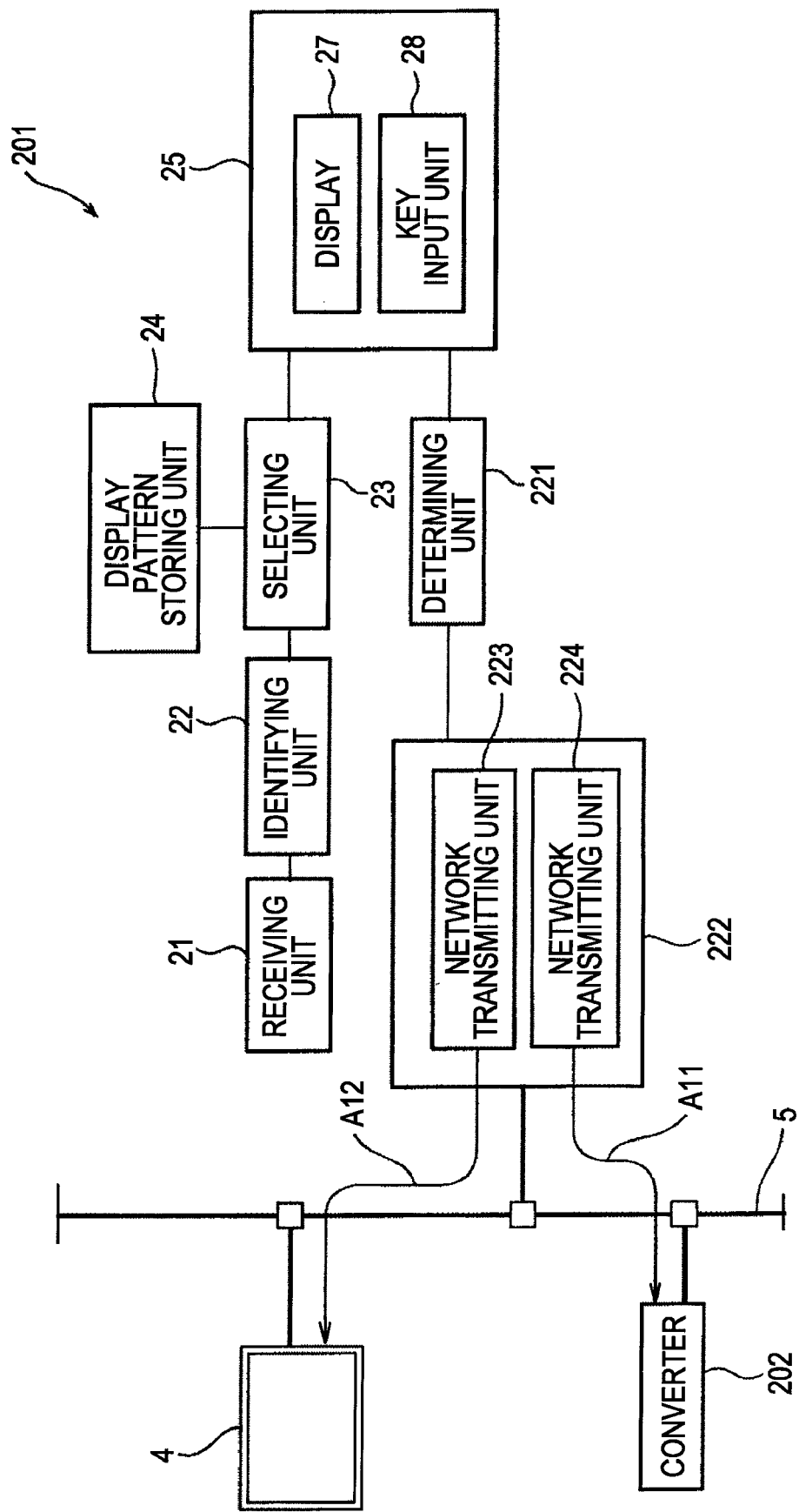
FIG. 24 is a block diagram of an example of a functional configuration of a controller 201 illustrated in FIG. 23.

FIG. 24 is a block diagram of an example of a functional configuration of the controller 201 illustrated in FIG. 23.

In the controller 201, the receiving unit 21, the identifying unit 22, the selecting unit 23, the display pattern storing unit 24, the operation panel 25, the display 27, and the key input unit 28 are the same as those in the controller 2 illustrated in FIG. 3, and thus the corresponding description is omitted.

In the controller 201, the operation panel 25 connects to a determining unit 221, and the determining unit 221 connects to a transmitting unit 222. The transmitting unit 222 includes a network transmitting unit 223 to transmit a command compatible with the standard or guideline of DLNA or UPnP via the network 5 and a network transmitting unit 224 to transmit a command corresponding to an infrared command, which is a command using infrared radiation as a medium.

The display pattern storing unit 24 of the controller 201 stores the display pattern table (FIG. 4), as described above.

Each of the display patterns registered in the display pattern table includes information of the commands operable to the content and layout information about placement for displaying input keys (GUI buttons) to input those commands on the display 27. The controller 201 can register (set) in advance a command to allow the amplifier 62 to process audio data of content in the information of the commands operable to the content included in the display patterns.

The renderer 4 can transmit a playback start notification including the information that audio data of the content is processed by the amplifier 62 to the controller 201 (e.g., step S25 in FIG. 7).

When the playback start notification includes the information that audio data of the content is processed by the amplifier 62, the selecting unit 23 selects the display pattern in which the command to allow the amplifier 62 to process audio data of the content is registered and supplies the display pattern to the operation panel 25.

The operation panel 25 displays the content operation screen on the display 27 based on the display pattern supplied from the selecting unit 23. For example, when content of the video (audio and visual) category is played back as in the content operation screen 30 illustrated in FIG. 5, the GUI buttons of the commands (running-related commands) to allow the renderer 4 to process visual data of the content are displayed on the upper side of the GUI button display unit 32, while the GUI buttons of the commands (volume-related commands) to allow the amplifier 62 to process audio data of the content are displayed on the lower side of the GUI button display unit 32.

The determining unit 221 determines whether a command corresponding to an infrared command, which is a command using infrared radiation, is to be transmitted via the network 5, and supplies the command to any one of the network transmitting units 223 and 224 of the transmitting unit 222. That is, the determining unit 221 determines whether the command selected by the user (GUI button of the command) on the content operation screen is a command to provide instructions about handling of the content in the renderer 4 or a command to provide instructions about handling of the content in the playback apparatus (e.g., the amplifier 62) connected to the renderer 4.

For example, when a command to allow the amplifier 62 to process audio data of the content is supplied from the operation panel 25, the determining unit 221 determines to transmit a command corresponding to an infrared command via the network 5, and supplies the command to the network transmitting unit 224. The network transmitting unit 224 generates a command corresponding to an infrared command based on the command supplied from the determining unit 221. Then, the network transmitting unit 224 transmits the generated command corresponding to an infrared command to the converter 202 via the network 5, as indicated by an arrow A11.

On the other hand, when a command to allow the renderer 4 to process visual data of the content is supplied from the operation panel 25, the determining unit 221 determines not to transmit a command corresponding to an infrared command via the network 5, and supplies the command to the network transmitting unit 223. Then, as indicated by an arrow A12, the network transmitting unit 223 transmits the command supplied from the determining unit 221 to the renderer 4 via the network 5.

The controller 201 can be provided with a command code set including commands to operate various types of AV apparatuses, such as the amplifier 62 and a DVD player, and can also be provided with a mechanism to specify the command code set of the amplifier 62 from this command code set. By using such a command code set, the controller 201 can register a command to allow the amplifier 62 to process audio data of content in the display patterns.

In the content distributing system 200 having the above-described configuration, after the controller 201 has transmitted a content requesting command (e.g., step S15 in FIG. 7) and after the renderer 4 has started playback of the selected piece of content (e.g., step S24 in FIG. 7), if the user requests displaying the content operation screen, the content operation screen displaying the GUI buttons of the commands to allow the renderer 4 to process visual data of the content and the GUI buttons of the commands to allow the amplifier 62 to process audio data of the content is displayed on the display 27.

Therefore, for example, if the GUI button of the command of the renderer 4 is selected by the user on the content operation screen, the controller 201 transmits the selected command, that is, the command compatible with the standard or guideline of DLNA or UPnP to the renderer 4 via the network 5. If the GUI button of the command of the amplifier 62 is selected, the controller 201 transmits the selected command, that is, the command corresponding to an infrared command compatible with the SIRCS method or the like, to the converter 202 via the network 5.

The command indicated by the GUI button of the command of the renderer 4 and the command indicated by the GUI button of the command of the amplifier 62 may be regarded as commands compatible with the standard or guideline of DLNA or UPnP, and may be transmitted to the renderer 4 or the converter 202 via the network 5. Alternatively, the command indicated by the GUI button of the command of the renderer 4 and the command indicated by the GUI button of the command of the amplifier 62 may be regarded as commands corresponding to an infrared command compatible with the SIRCS method or the like, and may be transmitted to the renderer 4 or the converter 202 via the network 5.

Figure 25:
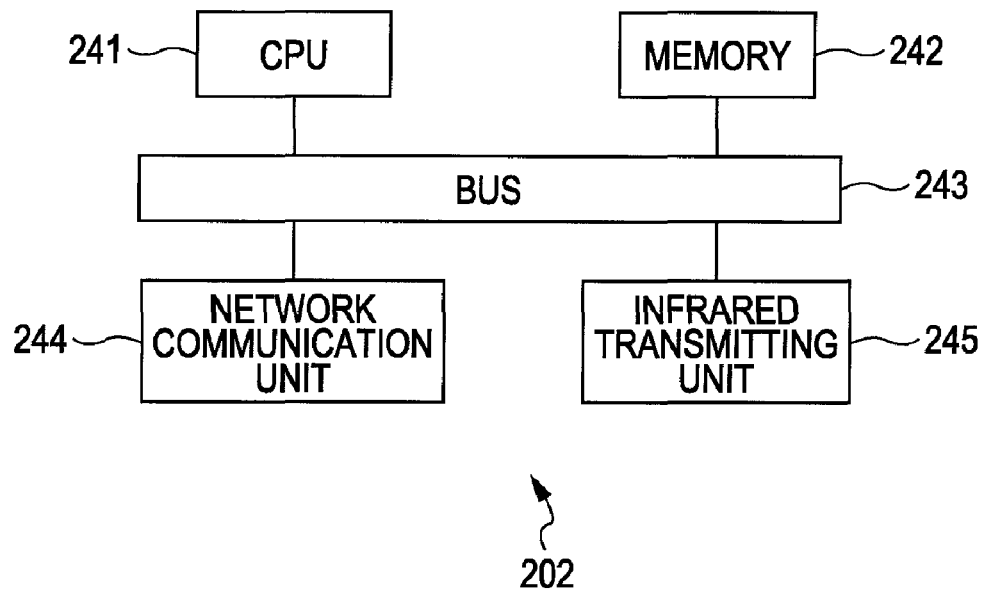
FIG. 25 is a block diagram of an example of a hardware configuration of a converter 202 illustrated in FIG. 23.

FIG. 25 is a block diagram of an example of a hardware configuration of the converter 202. The converter 202 includes a CPU 241, a memory 242, a bus 243, a network communication unit 244, and an infrared transmitting unit 245.

The CPU 241 executes a program and controls the entire converter 202. For example, the CPU 241 expands a program stored in the memory 242 serving as a ROM on the memory 242 serving as a RAM and executes a predetermined process based on the expanded program, so as to control the entire converter 202.

The memory 242 includes a ROM or a RAM and stores a program to execute the above-described series of processes and various data necessary for execution of the program.

The CPU 241 and the memory 242 are connected to each other via the bus 243. Also, the network communication unit 244 and the infrared transmitting unit 245 connect to the bus 243.

The network communication unit 244 communicates with another apparatus via the network 5 based on control by the CPU 241. For example, the network communication unit 244 communicates with the controller 201 via the network 5 serving as a wired or wireless medium. Unique identification information on the network 5, such as a MAC address, is set in the network communication unit 244.

The infrared transmitting unit 245 transmits an infrared command compatible with SIRCS, which is an infrared communication standard widely used in remote controls for AV apparatuses, based on control by the CPU 241.

Figure 26:
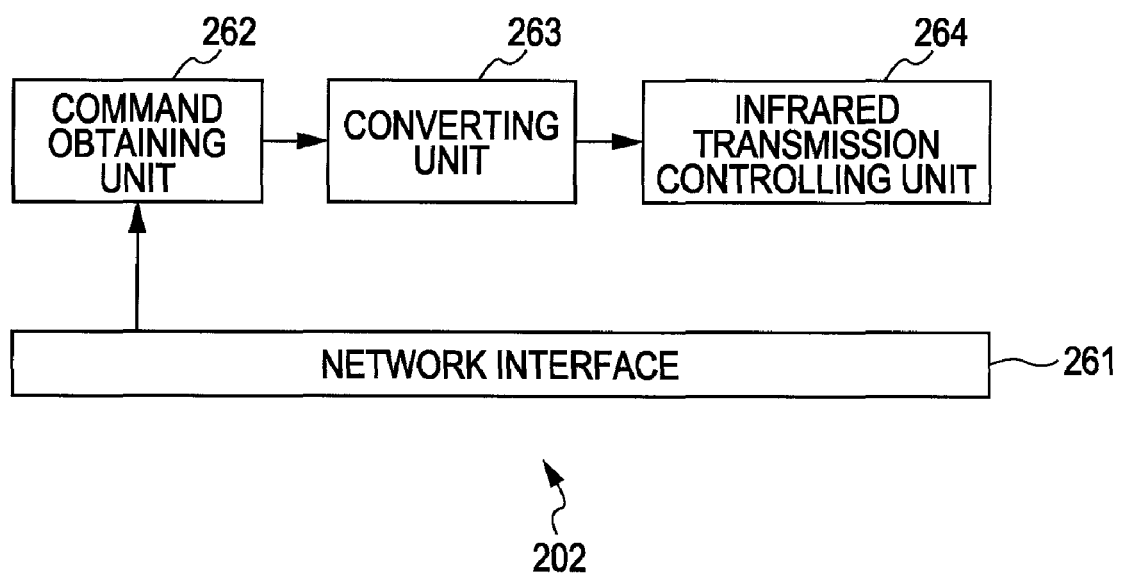
FIG. 26 is a block diagram of an example of a functional configuration of the converter 202 illustrated in FIG. 23.

FIG. 26 is a block diagram of an example of a functional configuration of the converter 202 to execute a program. When the converter 202 executes the program, a network interface 261, a command obtaining unit 262, a converting unit 263, and an infrared transmission controlling unit 264 are realized.

The network interface 261 controls the network communication unit 244 so as to control connection with the network 5 by the network communication unit 244 and communication with another apparatus via the network 5. The command obtaining unit 262 obtains a command corresponding to an infrared command via the network interface 261, the command being transmitted from the controller 201 via the network 5. The command obtaining unit 262 supplies the obtained command to the converting unit 263.

The converting unit 263 converts the command supplied from the command obtaining unit 262 to an infrared command. That is, the converting unit 263 converts the command supplied from the command obtaining unit 262 into a signal indicating a blinking pattern of an infrared command. The converting unit 263 supplies the signal obtained by conversion to the infrared transmission controlling unit 264.

The infrared transmission controlling unit 264 controls the infrared transmitting unit 245. That is, the infrared transmission controlling unit 264 controls the infrared transmitting unit 245 so as to allow the infrared transmitting unit 245 to transmit the infrared command according to the blinking pattern based on the signal indicating the blinking pattern supplied from the converting unit 263.

Figure 27:
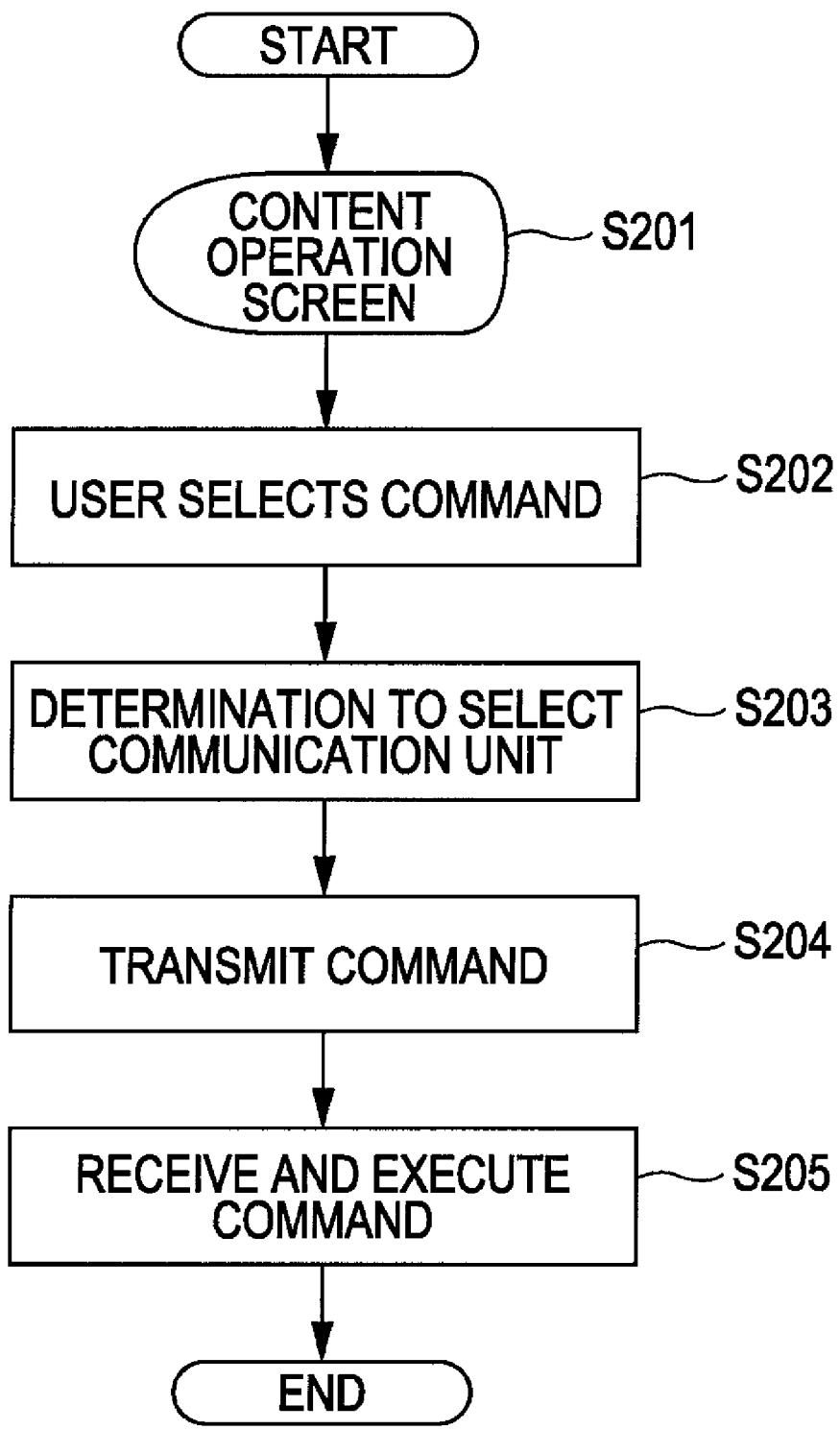
FIG. 27 is a flowchart illustrating a process performed by the content distributing system.

FIG. 27 is a flowchart illustrating a process performed by the content distributing system 200 after the content operation screen has been displayed on the display 27 of the operation panel 25 until a command is executed.

In step S201, the operation panel 25 of the controller 201 displays the content operation screen for displaying the GUI buttons of the renderer 4 and the GUI buttons of the amplifier 62 on the display 27, as described above, and the process proceeds to step S202.

After the user has selected a command to be executed on the content from among the commands on the content operation screen displayed on the display 27, the display 27 supplies the command to the determining unit 221 in step S202, and the process proceeds to step S203.

In step S203, the determining unit 221 determines whether a command corresponding to an infrared command, which is a command using infrared radiation, is to be transmitted via the network 5. That is, when the command input by the user through an operation of the GUI button of the renderer 4 is supplied from the display 27, the determining unit 221 determines not to transmit a command corresponding to an infrared command via the network 5. On the other hand, when the command input by the user through an operation of the GUI button of the amplifier 62 is supplied from the display 27, the determining unit 221 determines to transmit a command corresponding to an infrared command via the network 5.

If the determining unit 221 determines in step S203 not to transmit a command corresponding to an infrared command via the network 5, the determining unit 221 supplies the command to the network transmitting unit 223. Then, the process proceeds to step S204, where the network transmitting unit 223 transmits the command supplied from the determining unit 221 to the renderer 4 via the network 5, and the process proceeds to step S205. In step S205, the renderer 4 receives and executes the command transmitted from the network transmitting unit 223.

On the other hand, if the determining unit 221 determines in step S203 to transmit a command corresponding to an infrared command via the network 5, the determining unit 221 supplies the command to the network transmitting unit 224. Then, the process proceeds to step S204, where the network transmitting unit 224 generates a command corresponding to an infrared command based on the command supplied from the determining unit 221. Then, the network transmitting unit 224 transmits the generated command corresponding to an infrared command to the converter 202 via the network 5, and the process proceeds to step S205. In step S205, the converter 202 receives the command transmitted from the network transmitting unit 224, converts the received command to an infrared command using infrared radiation as a medium, and transmits the infrared command to the amplifier 62. The amplifier 62 receives and executes the infrared command transmitted from the converter 202.

As described above, the GUI buttons of the renderer 4 and the GUI buttons of the amplifier 62 are displayed on the content operation screen. Accordingly, the user can easily understand that he/she operates the GUI button of the amplifier 62 in order to adjust the volume of content and operates the GUI button of the renderer 4 in order to operate running of pictures, that is, to play back the content or pause.

After the controller 201 has generated the command corresponding to an infrared command and has transmitted the generated command to the converter 202 via the network 5, the converter 202 receives the command corresponding to an infrared command transmitted from the controller 201, converts it to an infrared command, and transmits the infrared command obtained through the conversion to the amplifier 62 in a transmitting process. Hereinafter, the transmitting process performed by the converter 202 is described with reference to the flowchart in FIG. 28.

In step S221, the command obtaining unit 262 allows the network interface 261 to receive the command corresponding to an infrared command transmitted from the controller 201 via the network 5. The command obtaining unit 262 obtains the received command from the network interface 261. The command obtaining unit 262 supplies the obtained command to the converting unit 263.

In step S222, the converting unit 263 converts the command supplied from the command obtaining unit 262 to an infrared command. More specifically, for example, the converting unit 263 converts the command supplied from the command obtaining unit 262 to a signal indicating a blinking pattern of an infrared command so as to convert the command transmitted from the controller 201 to an infrared command in step S222. The converting unit 263 supplies (the signal indicating the blinking pattern of) the infrared command obtained through the conversion to the infrared transmission controlling unit 264.

In step S223, the infrared transmission controlling unit 264 allows the infrared transmitting unit 245 to transmit the infrared command to the amplifier 62, and the transmitting process ends. That is, the infrared transmission controlling unit 264 controls the infrared transmitting unit 245 based on the signal indicating the blinking pattern of the infrared command supplied from the converting unit 263 and allows the infrared transmitting unit 245 to transmit the infrared command of the blinking pattern indicated by the signal. In this way, the infrared transmitting unit 245 transmits the command using infrared radiation as a medium to the amplifier 62 (emits infrared radiation as a command).

After the converter 202 has transmitted the command using infrared radiation as a medium to the amplifier 62, the amplifier 62 receives the infrared radiation as the command transmitted from the converter 202 and executes the received command. Accordingly, the amplifier 62 can control playback of voice in the content input from the renderer 4 connected via the audio cable 64 based on the command.

Figure 28:
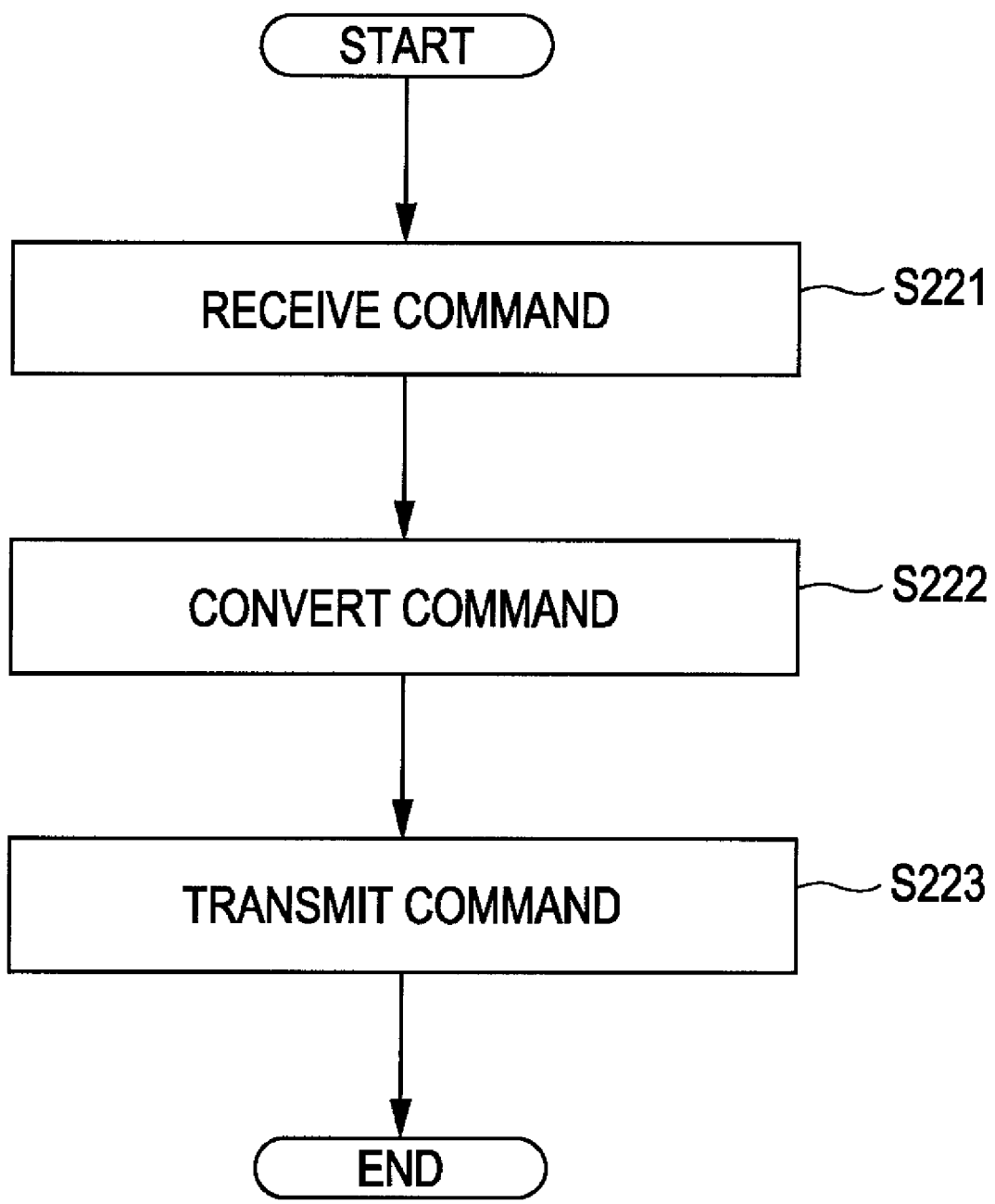
FIG. 28 is a flowchart illustrating a transmitting process.

As described above, according to the transmitting process described with reference to FIG. 28, even if a device to transmit a command controlling playback of content via a network (e.g., a command indicated by the GUI button of the volume-related command) does not have a function to transmit an infrared command, an apparatus not capable of connecting to the network can be controlled.

Even if the device to transmit a command via the network and the apparatus not capable of connecting to the network controlled by the device are isolated from each other, for example, if they are placed in different rooms or different floors, the apparatus not capable of connecting to the network can be controlled if the apparatus not capable of connecting to the network is placed near an apparatus to receive a command and transmit the command after converting it to an infrared command.

Alternatively, a command corresponding to an infrared command may be transmitted via the network, and an apparatus received this command may emit infrared radiation as an infrared command to the vicinity of a receiving unit to receive the infrared command of an apparatus to be controlled.

Figure 29:
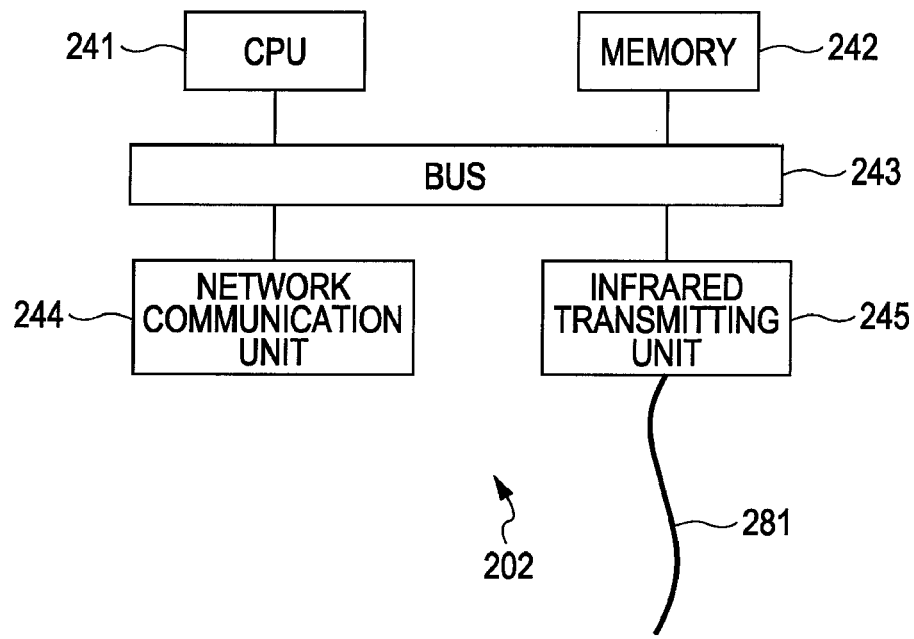
FIG. 29 is a block diagram of another example of the hardware configuration of the converter 202.

FIG. 29 is a block diagram of another example of the hardware configuration of the converter 202, which emits infrared radiation as an infrared command to the vicinity of an infrared receiving unit of the apparatus to be controlled. The parts same as those in FIG. 25 are denoted by the same reference numerals, and the corresponding description is omitted. An optical fiber 281 is made of a light-guiding material, such as glass or plastic, receives infrared radiation from its one end, and outputs it from the other end.

One end of the optical fiber 281 is placed at the position to emit infrared radiation of the infrared transmitting unit 245. The other end of the optical fiber 281 is placed at the vicinity of the receiving unit to receive an infrared command of the amplifier 62, which is an example of the apparatus to be controlled, so that the infrared radiation emitted from the other end enters the receiving unit of the amplifier 62.

The infrared radiation as an infrared command emitted from the infrared transmitting unit 245 enters the optical fiber 281 from its one end and is emitted from the other end of the optical fiber 281. The infrared radiation as an infrared command emitted from the other end of the optical fiber 281 enters the receiving unit of the amplifier 62.

In this way, infrared radiation as an infrared command is emitted to the vicinity of the infrared receiving unit of the apparatus to be controlled. Thus, even if a stronger obstacle exists, for example, even if the apparatus to be controlled is placed near the window through which the sunlight comes in, the apparatus to be controlled can be reliably controlled.

Figure 30:
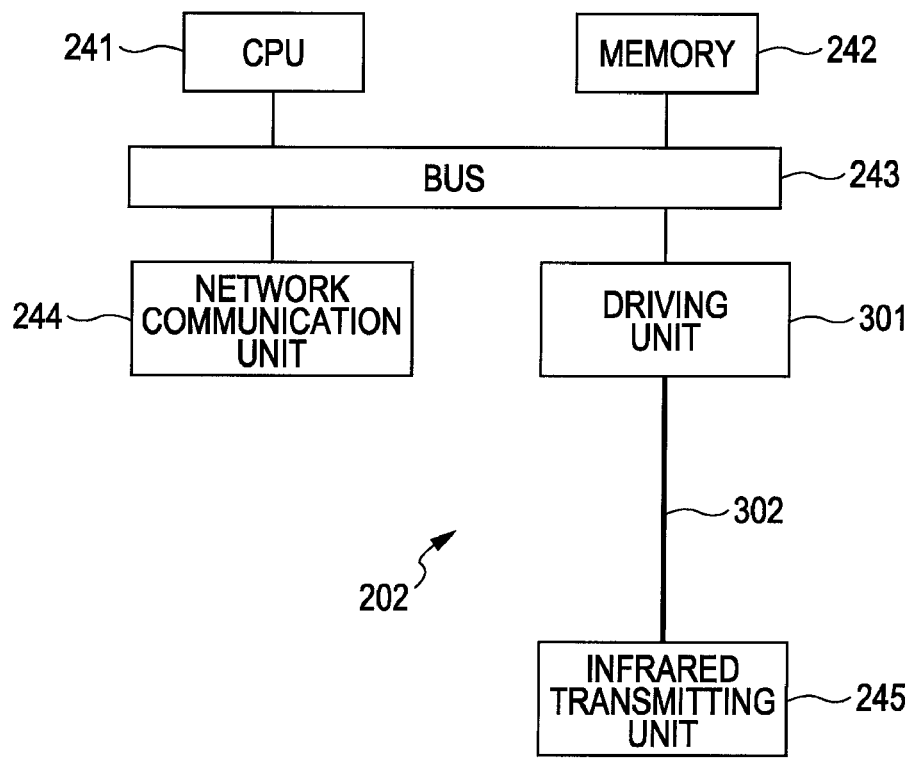
FIG. 30 is a block diagram of still another example of the hardware configuration of the converter 202.

FIG. 30 is a block diagram of still another example of the hardware configuration of the converter 202 to emit infrared radiation as an infrared command to the vicinity of the infrared receiving unit of the apparatus to be controlled. The parts same as those in FIG. 25 are denoted by the same reference numerals, and the corresponding description is omitted. A driving unit 301 amplifies a signal of a voltage output from the bus 243 or outputs a signal of a current of a predetermined value according to the signal output from the bus 243. The signal output from the driving unit 301 is supplied to the infrared transmitting unit 245 via a conductive cable 302.

By providing the driving unit 301, a signal to emit infrared command is transmitted to the infrared transmitting unit 245 more accurately and more reliably even if the cable 302 is long, and thus infrared radiation as an infrared command can be emitted more reliably.

The driving unit 301 may not be provided when the cable 302 is short.

The infrared transmitting unit 245 of the converter 202 illustrated in FIG. 30 is placed near the receiving unit to receive an infrared command of the amplifier 62.

With this configuration, infrared radiation as an infrared command is emitted to the vicinity of the infrared receiving unit of the apparatus to be controlled. Thus, even if a stronger obstacle exists, for example, even if the apparatus to be controlled is placed near the window through which the sunlight comes in, the apparatus to be controlled can be reliably controlled.

According to the above description, the converter 202 transmits an infrared command. However, the transmitted command is not limited to the infrared command, but a predetermined command may be transmitted to the apparatus to be controlled via a wired or wireless medium by using a path other than the network 5. For example, instead of the infrared transmitting unit 245 or in addition to the infrared transmitting unit 245, an interface for communication using a wired medium compatible with the standard of RS-232-C, RS-422-A, or USB (universal serial bus) may be provided in the converter 202, and the converter 202 may transmit a predetermined command to the apparatus to be controlled by using the wired medium. For example, instead of the infrared transmitting unit 245 or in addition to the infrared transmitting unit 245, an interface for communication using a wireless medium compatible with the standard of Bluetooth or the like may be provided in the converter 202, and the converter 202 may transmit a predetermined command to the apparatus to be controlled by using the wireless medium.

Alternatively, the renderer 4, not the controller 201, may transmit a control command to the converter 202 via the network 5, and the converter 202 may convert the command transmitted from the renderer 4 to an infrared command and transmit the infrared command obtained through conversion.

In this embodiment, the controller 2 and the server 3 transmit/receive a command via the renderer 4 (e.g., steps S21 and S22 in FIG. 7 or steps S64 and S65 in FIG. 9). Alternatively, the controller 2 and the server 3 may directly transmit/receive a command.

Furthermore, a server (not shown) to manage the entire content distributing system may be provided so that the server performs the operation panel information generating process (step S74 in FIG. 9) and transmits operation panel information to the controller 2. In this case, the controller 2 transmits an operation screen requesting command to the server.

Also, the controller 2 and the renderer 4 or the server 3 and the renderer 4 may be provided in the casing of the same apparatus so as to constitute the content distributing system.

If a plurality of renderers connect to the content distributing system, the key input unit 28 may include an input key to select one of the renderers to play back content. In this case, the user selects the renderer to play back content before displaying the content selection screen (step S13 in FIG. 7 or step S51 in FIG. 9).

After the controller 2 has received the playback start notification (step S16 in FIG. 7 or step S54 in FIG. 9), the controller 2 can automatically perform a process of displaying the content operation screen without a user's request for displaying the content operation screen.

The display 27 may not have a function of a touch-panel display. For example, the display 27 may display the names of commands and the key input unit 28 may have an input key to select the name of one of the commands displayed on the display 27. In this case, the user can perform an operation of specifying the command to be executed on the content by operating the input key to select the name of the command displayed on the display 27, and the key input unit 28 accepts the operation.

The controller 2 may not include the display 27. For example, among the input keys of the key input unit 28 (not GUI buttons, but physical buttons), an input key to input the commands operable to the content may be lighted while the light of the other input keys may be turned off so that the user can recognize the operable commands. The input key can be lighted by using an LED (light emitting diode) embedded in the input key.

The respective processes described above with reference to the flowcharts need not always be performed in time series in accordance with the order described as the flowcharts, but may be performed in parallel or individually (e.g., including a parallel process or a process by an object).

The invention claimed is:

1. A content distributing system including a playback apparatus to play back content and a control apparatus to control the playback apparatus by transmitting a command to the playback apparatus,
   the playback apparatus comprising:
      identifying means for identifying a category of content to be played back; and
      transmitting means for transmitting an identification result of the category generated by the identifying means to the control apparatus, and
   the control apparatus comprising:
      receiving means for receiving the identification result transmitted from the playback apparatus;
      storage means for storing command information indicating handling of the content of each category;
      selecting means for selecting a piece of command information corresponding to the category of the content to be played back from the command information stored in the storage means based on an identification result received from the playback apparatus;
      processing means for performing a process of allowing a user to recognize a command to provide instructions about handling of the content to be played back based on the piece of command information selected by the selecting means; and
      accepting means for accepting an operation of specifying a command to provide instructions about handling of the content.

2. A content distributing method for a content distributing system including a playback apparatus to play back content and a control apparatus to control the playback apparatus by transmitting a command to the playback apparatus, the content distributing method comprising:
   identifying a category of content to be played back;
   transmitting an identification result of the category identified to the control apparatus;
   receiving the identification result transmitted from the playback apparatus;
   storing command information indicating handling of the content of each category;
   selecting a piece of command information corresponding to the category of the content to be played back from the stored command information based on the identification result of the category of the content to be played back;
   performing a process of allowing a user to recognize a command to provide instructions about handling of the content to be played back based on the piece of command information selected; and
   accepting an operation of specifying a command to provide instructions about handling of the content.

3. A computer-readable medium including a program, which when executed by a computer provided in a content distributing system including a playback apparatus, causes the computer to perform a method to play back content and a control apparatus to control the playback apparatus by transmitting a command to the playback apparatus, the method comprising:
   identifying a category of content to be played back;
   controlling transmission of an identification result of the category identified to the control apparatus;
   controlling reception of the identification result transmitted from the playback apparatus;
   storing command information indicating handling of the content of each category;
   selecting a piece of command information corresponding to the category of the content to be played back from the stored command information based on the identification result;
   performing a process of allowing a user to recognize a command to provide instructions about handling of the content to be played back based on the piece of command information selected; and
   accepting an operation of specifying a command to provide instructions about handling of the content.

4. A control apparatus to control a playback apparatus to play back content by transmitting a command to the playback apparatus, the control apparatus comprising:
   identifying means for identifying a category of the content to be played back;
   storage means for storing command information indicating handling of the content of each category;
   selecting means for selecting a piece of command information corresponding to the category of the content to be played back from the command information stored in the storage means based on an identification result of the category generated by the identifying means;
   a processing means for performing a process of allowing a user to recognize a command to provide instructions about handling of the content to be played back based on the piece of command information selected by the selecting means; and
   accepting means for accepting an operation of specifying a command to provide instructions about handling of the content.

5. The control apparatus according to claim 4,
   wherein the storage means stores the command information which further includes display information for displaying images representing the commands, and
   wherein the processing means has a display function of displaying the images representing the commands based on the display information selected by the selecting means.

6. The control apparatus according to claim 4, further comprising:
   receiving means for receiving command information that is transmitted from the playback apparatus and that indicates handling of the content to be played back,
   wherein the processing means performs a process of allowing a user to recognize a command to provide instructions about handling of the content to be played back based on the command information received by the receiving means.

7. The control apparatus according to claim 4, further comprising:
- determining means for determining whether the command specified by the operation accepted by the accepting means is a command to provide instructions about handling of content in the playback apparatus or a command to provide instructions about handling of content in another playback apparatus that is connected to the playback apparatus and that plays back part of the content; and
- transmitting means for transmitting the command specified by the operation accepted by the accepting means to one of the playback apparatus and the other playback apparatus based on a determination result generated by the determining means.

8. A control apparatus to control a playback apparatus to play back content by transmitting a command to the playback apparatus, the control apparatus comprising:
- processing means for performing a process of allowing a user to recognize a command to provide instructions about handling of content to be played back among commands to provide instructions about handling of the content in the playback apparatus;
- accepting means for accepting an operation of specifying a command to provide instructions about handling of the content;
- determining means for determining whether the command specified by the operation accepted by the accepting means is a command to provide instructions about handling of content in the playback apparatus or a command to provide instructions about handling of content in another playback apparatus that is connected to the playback apparatus and that plays back part of the content;
- first transmitting means for transmitting the command that is specified by the operation accepted by the accepting means and that provides instructions about handling of content in the playback apparatus to the playback apparatus via a network based on a determination result generated by the determining means; and
- second transmitting means for transmitting the command that is specified by the operation accepted by the accepting means and that provides instructions about handling of content in the other playback apparatus to an apparatus to convert a command transmitted via the network to a command using infrared radiation as a medium via the network based on a determination result generated by the determining means.

9. A control method for a control apparatus to control a playback apparatus to play back content by transmitting a command to the playback apparatus, the control method comprising:
- identifying a category of the content to be played back;
- storing command information indicating handling of the content of each category;
- selecting a piece of command information corresponding to the category of the content to be played back from the stored command information based on an identification result of the category of the content to be played back;
- performing a process of allowing a user to recognize a command to provide instructions about handling of the content to be played back based on the piece of command information selected; and
- accepting an operation of specifying a command to provide instructions about handling of the content.

10. A computer-readable medium including a program, which when executed by a computer provided in a control apparatus, causes the computer perform a method to control a playback apparatus to play back content by transmitting a command to the playback apparatus, the method comprising:
- identifying a category of the content to be played back;
- storing command information indicating handling of the content of each category;
- selecting a piece of command information corresponding to the category of the content to be played back from the stored command information based on an identification result of the category of the content to be played back;
- performing a process of allowing a user to recognize a command to provide instructions about handling of the content to be played back based on the piece of command information selected; and
- accepting an operation of specifying a command to provide instructions about handling of the content.

* * * * *